United States Patent
Janusch et al.

(10) Patent No.: US 12,294,129 B2
(45) Date of Patent: May 6, 2025

(54) DEVICE AND METHOD FOR STACKING CELL COMPONENTS AND A DEVICE AND METHOD FOR MANUFACTURING A FUEL CELL LAYER STRUCTURE

(71) Applicant: GROB-WERKE Gmbh & Co. KG, Mindelheim (DE)

(72) Inventors: Tim Janusch, Erkheim (DE); Karl Rudolf Michl, Erkheim (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 617 days.

(21) Appl. No.: 17/525,702

(22) Filed: Nov. 12, 2021

(65) Prior Publication Data
US 2022/0158218 A1   May 19, 2022

(30) Foreign Application Priority Data

Nov. 16, 2020 (DE) ...................... 10 2020 130 242.8
Feb. 26, 2021 (EP) ..................................... 21159734

(51) Int. Cl.
*B23P 19/00* (2006.01)
*B65G 57/14* (2006.01)
(Continued)

(52) U.S. Cl.
CPC .......... *H01M 8/2475* (2013.01); *B65G 57/14* (2013.01); *H01M 8/1004* (2013.01); *H01M 8/2404* (2016.02)

(58) Field of Classification Search
CPC .. B65G 47/5154; B65G 57/035; B65G 57/14; B65G 57/308; B65G 59/066;
(Continued)

(56) References Cited

U.S. PATENT DOCUMENTS 5,053,291 A * 10/1991 Hirota ................... H01M 8/247
429/514
2007/0271770 A1   11/2007 Fujiki et al.
(Continued)

FOREIGN PATENT DOCUMENTS

CN         109768311 A      5/2019
DE    102018103568 A1      8/2019
(Continued)

OTHER PUBLICATIONS

Brennstoffzelle—Wikipedia, downloaded on Nov. 16, 2020 at https://de.wikipedia.org/wiki/Brennstoffzelle; 20 pages.
(Continued)

*Primary Examiner* — Paul D Kim
(74) *Attorney, Agent, or Firm* — Greer, Burns & Crain, Ltd.

(57) ABSTRACT

A cell component de-stacking device for vertically de-stacking separated cell components, including at least one vertical de-stacker with a vertical magazine for accommodating a plurality of the cell components in a vertical arrangement and with a lifting and lowering device for lifting and lowering the cell components in the vertical magazine and for de-stacking separated cell components in the vertical direction, and a delivery device for delivering separated cell components at a filling station to the vertical de-stacker. The vertical de-stacker is configured for filling the vertical magazine at the filling station by individually accommodating the cell components and moving them by means of the lifting and lowering device, and for being moved between the filling station and the stacking station, and for individually dispensing the cell components in the vertical direction at the stacking station by means of a downward movement.

11 Claims, 10 Drawing Sheets

(51) Int. Cl.
*H01M 8/1004* (2016.01)
*H01M 8/2404* (2016.01)
*H01M 8/2475* (2016.01)

(58) Field of Classification Search
CPC .. B65G 60/00; H01M 8/1004; H01M 8/2404; H01M 8/2475; Y02E 60/50; Y02P 70/50
See application file for complete search history.

(56) References Cited

U.S. PATENT DOCUMENTS

| | | |
|---|---|---|
| 2008/0138185 A1 | 6/2008 | Maing |
| 2010/0291458 A1* | 11/2010 | Takeyama ........... H01M 8/2483 429/458 |
| 2015/0364785 A1 | 12/2015 | Lee et al. |
| 2016/0285124 A1 | 9/2016 | Martinchek et al. |
| 2017/0207477 A1 | 7/2017 | Heinzmann et al. |
| 2019/0245236 A1* | 8/2019 | Taguchi ................ H01M 8/247 |

FOREIGN PATENT DOCUMENTS

| | | |
|---|---|---|
| KR | 20150079461 A | 7/2015 |
| WO | 03044324 A1 | 5/2003 |
| WO | 2005067085 A1 | 7/2005 |
| WO | 2020216758 A1 | 10/2020 |

OTHER PUBLICATIONS

Polymerelektrolytbrennstoffzelle—Wikipedia, downloaded on Nov. 13, 2020, at https://de.wikipedia.org/wiki/Polymerelektrolytbrennstoffzelle; 6 pages.
Proton-exchange membrane fuel cell—Wikipedia, downloaded on Nov. 13, 2020, at https://en.wikipedia.org/wiki/Proton-exchange_membrane_fuel_cell; 16 pages.
Membrane electrode assembly—Wikipedia, downloaded on Nov. 13, 2020, at https://en.wikipedia.org/wiki/Membrane_electrode_assembly; 3 pages.

* cited by examiner

DEVICE AND METHOD FOR STACKING CELL COMPONENTS AND A DEVICE AND METHOD FOR MANUFACTURING A FUEL CELL LAYER STRUCTURE

CROSS-REFERENCES TO RELATED APPLICATIONS

This application claims the benefit of the European Application No. 21159734.9, filed on Feb. 26, 2021, and of the German patent application No. 102020130242.8 filed on Nov. 16, 2020, the entire disclosures of which are incorporated herein by way of reference.

FIELD OF THE INVENTION

The invention relates to a cell component de-stacking device for vertically de-stacking separated cell components at a stacking station in the course of manufacturing a fuel cell layer structure. The invention further relates to a manufacturing device for manufacturing a fuel cell layer structure with alternately arranged first and second cell components configured in a plate-like or membrane-like manner. The invention further relates to a cell component de-stacking method for vertically de-stacking separated cell components at a stacking station in the course of manufacturing a fuel cell layer structure. The invention further relates to a manufacturing method for manufacturing a fuel cell layer structure with alternately arranged first and second cell components configured in a plate-like or membrane-like manner. Finally, the invention relates to a computer program and a control system for use in such devices and methods.

BACKGROUND OF THE INVENTION

A stack is a neatly layered pile of a quantity of identical things or a quantity of identical things placed neatly one above the other. Stacking is understood to be the formation of a stack. De-stacking is understood to be the dispensing or removal from a stack. A de-stacker is a device for de-stacking. A cell component de-stacking device is a device configured for stacking cell components to form a stack and dispensing individual cell components from the cell component stack in a separated manner. Accordingly, a cell component de-stacking method is a method in which cell components are stacked to form a stack and individual cell components are dispensed in a separated manner from the stack.

SUMMARY OF THE INVENTION

The invention lies within the field of layer structures in the course of the manufacture of fuel cells. Preferred embodiments of the invention relate to a device and method for vertically de-stacking separated cell components at a stacking station in the course of manufacturing a fuel cell layer structure. Further preferred embodiments of the invention relate to a device and method for manufacturing a fuel cell layer structure with alternately arranged first and second cell components configured in a plate-like or membrane-like manner Particularly preferred embodiments of the invention relate to a device and method for introducing BPPs into the stacking process of a PEMFC and to a device and method for carrying out this stacking process.

With respect to the technological background and the explanation of terms, reference is made to the following sources:

[1] Brennstoffzelle—Wikipedia, downloaded on Nov. 16, 2020 at https://de.wikipedia.org/wiki/Brennstoffzelle
[2] Polymerelektrolytbrennstoffzelle—Wikipedia, downloaded on Nov. 13, 2020, at https://de.wikipedia.org/wiki/Polymerelektrolytbrennstoffzelle
[3] Proton-exchange membrane fuel cell—Wikipedia, downloaded on Nov. 13, 2020, at https://en.wikipedia.org/wiki/Proton-exchange_membrane_fuel_cell
[4] Membrane electrode assembly—Wikipedia, downloaded on Nov. 13, 2020, at https://en.wikipedia.org/wiki/Membrane_electrode_assembly
[5] US 2008/0138185 A1
[6] unpublished European patent application, application number EP20176004.8
[7] WO 2020/216758 A1
[8] unpublished German patent application, application number DE10 2020 133 413.3

Devices and methods for manufacturing a fuel cell layer structure are known from source [5] in which membrane electrode assemblies (abbreviated MEA) and separators are alternately introduced from respective delivery units into a transferring unit and then lowered, in this order, in a downward direction onto a plate of a stacking device, where a cell stack for forming the fuel cell layer structure is then formed.

The invention has given itself an object of providing devices, apparatuses and methods to be used in the manufacture of fuel cells which are improved with respect to cycle time optimization, reliability and applicability in existing or future manufacturing plants.

In order to achieve this object, the invention provides the device, the method and the apparatus according to the independent claims.

Advantageous embodiments are the subject matter of the dependent claims.

According to a first aspect thereof, the invention provides a cell component de-stacking device for vertically de-stacking separated cell components at a stacking station in the course of manufacturing a fuel cell layer structure, comprising
  at least one vertical de-stacker with a vertical magazine for accommodating a plurality of the cell components in a vertical arrangement and with a lifting and lowering device for lifting and lowering the cell components in the vertical magazine and for de-stacking separated cell components in the vertical direction, a delivery device for delivering separated cell components at a filling station to the vertical de-stacker,
  wherein the vertical de-stacker is configured for filling the vertical magazine at the filling station by individually accommodating the cell components and moving them by means of the lifting and lowering device, and
  wherein the vertical de-stacker is further configured for being moved between the filling station and the stacking station, and for individually dispensing the cell components in the vertical direction at the stacking station by means of a downward movement.

Preferably, the vertical de-stacker has a self-supporting housing or frame structure.

Preferably, the vertical de-stacker has at least one first conveying means movable in the vertical direction at a first side of the vertical magazine and at least one second conveying means synchronously movable in the vertical direction at a second side opposite the first side, wherein the conveying means each have a row of gripping members for gripping and holding the cell components. In particular, the conveying means is a traction means, such as a conveyor, a chain, a cable, a belt or the like. In particular, positive conveying means are provided, which permit exact positioning without slippage. Particularly preferably, the traction means is a transporting conveyor, more particularly a toothed belt.

Preferably, the vertical de-stacker has at least one first toothed belt movable in the vertical direction at a first side of the vertical magazine and at least one second toothed belt synchronously movable in the vertical direction at a second side opposite the first side.

Preferably, the vertical de-stacker has an actuator for driving the lifting and lowering movement or a coupling device for coupling an actuator for driving the lifting and lowering movement thereto.

Preferably, the vertical de-stacker has a positioning device for positioning the vertical magazine at the filling station and/or at the stacking station.

Preferably, the vertical de-stacker has a braking system for braking at least the downward movement of the cell components in the vertical magazine.

Preferably, the vertical de-stacker has at least one abutting and/or guiding device for positioning and/or guiding the cell components during filling and/or lifting and lowering.

Preferably, the vertical de-stacker has a vertical guiding device, which is funnel-shaped in at least some areas, for positioning the cell components in the delivery direction.

Preferably, the vertical de-stacker has a closure system for disengageably fixing the, or at least one, abutting and guiding device.

Preferably, the vertical magazine has a substantially cuboid configuration.

Preferably, the lifting and lowering device is disposed at a first vertically extending side and an opposite second vertically extending side of the vertical magazine. Preferably, at least one abutting or guiding device, against which the cell components accommodated in the vertical magazine abut, is removably disposed at a third and/or fourth vertically extending side extending transversely to the first and second.

Preferably, the delivery device has at least one accommodating unit for accommodating, in a positioned manner, the vertical de-stacker. In other words, the accommodating unit is configured for correctly positioning a vertical de-stacker when accommodating it.

Preferably, the delivery device has one or more further accommodating units for accommodating, in a positioned manner, one further vertical de-stacker each.

Delivery may take place at an upper end of the vertical de-stacker, wherein the cell components are moved downwards for filling. In that case, the delivery device may also be configured for delivering the cell components to the vertical de-stacker from above. Preferably, the delivery device is configured for delivering the cell components at a lower end of the vertical de-stacker, wherein further preferably, in the vertical de-stacker, the cell components already located therein are then lifted upwards for filling Preferably, the delivery device is configured for laterally delivering the cell components.

Preferably, the delivery device has a feed conveying means for laterally delivering the cell components to the at least one vertical de-stacker. The feed conveying means is preferably configured as a preferably positive traction means, such as a chain, conveyor or belt and, particularly preferably, is a feed conveyor.

Preferably, the delivery device has a guiding system, which is funnel-shaped in at least some areas, for positioning the cell components in the direction transverse to the delivery direction during delivery.

Preferably, the delivery device has a row of positive gripping members that are configured for positively gripping the cell components and are movable for delivering the cell components towards the vertical de-stacker.

Preferably, the delivery device has a drive system for the delivery movement.

Preferably, the delivery device has at least one actuator for driving the lifting and lowering movement of the cell components in the vertical magazine and at least one preferably switchable coupling device for coupling the actuator with the lifting and lowering device of the at least one vertical de-stacker.

Preferably, the delivery device is configured for accommodating a first vertical de-stacker at a first accommodating unit and a second vertical de-stacker at a second accommodating unit and for filling them consecutively.

Preferably, the delivery device is configured for filling, in parallel, several vertical de-stackers at accommodating units disposed consecutively in the delivery direction.

In one embodiment, the delivery device is configured for filling the at least one vertical de-stacker from above. In other embodiments, the delivery unit is configured for filling the at least one vertical de-stacker from the side.

According to another aspect, the invention provides a manufacturing device for manufacturing a fuel cell layer structure with alternately arranged first and second cell components configured in a plate-like or membrane-like manner, comprising:
  a stacking station with at least one stacking device for stacking the first and the second cell component on top of one another in an alternating manner,
  a vertical de-stacker, which can be moved between at least one filling station and the stacking station, for accommodating a plurality of first cell components in a vertical arrangement with a lifting and lowering device for lifting and lowering the first cell components and for de-stacking separated first cell components in the vertical direction to the stacking device, and
  a lateral feed system for laterally feeding separated second cell components to the stacking device.

Preferably, the manufacturing device comprises a cell component de-stacking device according to any one of the above configurations for providing the vertical de-stacker filled with first cell components.

Preferably, the manufacturing device has a plurality of stacking devices that can be moved in a loop between the stacking station and at least one further processing station for further processing the fuel cell layer structure stacked in the stacking device.

Preferably, the manufacturing device has a plurality of vertical de-stackers that can be moved in a loop between an accommodating unit at the stacking station and accommodating units at the filling station.

Preferably, the manufacturing device has a depositing station for depositing end components of the cell layer structure at the stacking device.

Preferably, the manufacturing device has a removal station for removing the fuel cell layer structure from the stacking device.

Preferably, the manufacturing device has at least one pressing station with a pressing machine for pressing the fuel cell layer structure.

According to another aspect, the invention provides a cell component de-stacking method for vertically de-stacking separated cell components at a stacking station in the course of manufacturing a fuel cell layer structure, comprising a) providing at least one vertical de-stacker with a vertical magazine for accommodating a plurality of the cell components in a vertical arrangement and with a lifting and lowering device for lifting and lowering the cell components in the vertical magazine and for de-stacking separated cell components in the vertical direction, b) filling the vertical de-stacker at a filling station with separated cell components while moving already accommodated cell components in the vertical magazine, c) moving the filled vertical de-stacker to a stacking station, and d) lowering the lifting and lowering device for de-stacking the individual cell components at the stacking station.

Preferably, the cell component de-stacking device according to any one of the embodiments explained in more detail above is configured for carrying out the cell component de-stacking method.

Preferably, the cell component de-stacking method can be carried out with a cell component de-stacking device according to any one of the embodiments explained in more detail above, or is carried out therewith.

Preferably, the cell component de-stacking method comprises the step:

positioning the cell components in the direction transverse to a feed direction while feeding the cell components to the vertical de-stacker in step b).

Preferably, the cell component de-stacking method comprises the step:

positioning the cell components in the feed direction while lifting the cell components in the vertical de-stacker.

Preferably, the cell component de-stacking method comprises the step:

checking the cell components and removing a defective cell component at the filling station or while feeding it to the filling station.

Preferably, the cell component de-stacking method comprises the step:

inserting a cell component into the vertical stacker at a place that is vacant due to the removal of a defective cell component.

Preferably, the cell component de-stacking method comprises the step:

manually or automatically actuating a closure system of the vertical de-stacker for inserting a cell component into the vertical stacker at a place that is vacant due to the removal of a defective cell component.

Preferably, the cell component de-stacking method comprises the step:

moving, by means of a vertical handling system, a new cell component to the level of a vacant place in the vertical stacker for filling the same. In particular, the vertical handling system is a lifting system for raising another delivered cell component to the level of the vacant place.

Preferably, the cell component de-stacking method comprises the step:

positioning the vertical stacker by means of a positioning device, in particular a zero-point clamping device, at at least one accommodating unit of the filling station and at at least one accommodating unit of the stacking station.

Preferably, the cell component de-stacking method comprises the step:

providing a further vertical de-stacker at a further accommodating unit of the filling station already while filling the previous vertical de-stacker.

Preferably, the cell component de-stacking method comprises the step:

filling, in parallel, several vertical de-stackers at different accommodating units of the filling station that are consecutively arranged in the delivery direction.

According to another aspect, the invention provides a manufacturing method for manufacturing a fuel cell layer structure with alternately arranged first and second cell components configured in a plate-like or membrane-like manner, comprising:

e) providing a stacking device at a stacking station, f) vertically de-stacking a first cell component in alternation with a lateral feeding of a second cell component on the stacking device, g) transporting the stacking device with the cell layer structure thus formed towards the further processing and removal of the cell layer structure, h) transporting the stacking device back to the stacking station.

The embodiments of the manufacturing device explained above are preferably configured for carrying out the manufacturing method. Preferably, the manufacturing method can be carried out with a manufacturing device according to any one of the above-mentioned embodiments, or is carried out therewith.

Preferably, the manufacturing method comprises the step:

using several stacking devices and moving the stacking devices in a loop between the stacking station and at least one further processing station.

Preferably, the manufacturing method comprises the step:

using several vertical de-stackers and moving the vertical de-stackers in a loop between the stacking station and accommodating units of the filling station.

According to another aspect, the invention provides a computer program, comprising machine-readable control instructions which, when uploaded into a control unit of a cell component de-stacking device according to any one of the above embodiments, cause the latter to carry out the cell component de-stacking method according to any one of the above embodiments.

According to another aspect, the invention provides a computer program, comprising machine-readable control instructions which, when uploaded into a control system of a manufacturing device according to any one of the above embodiments, cause the latter to carry out the manufacturing method according to any one of the above embodiments.

According to another aspect, the invention provides a control system with a control unit for a cell component de-stacking device according to any one of the above embodiment, wherein the control unit is configured for controlling the cell component de-stacking device for carrying out the cell component de-stacking method according to any one of the above embodiments.

According to another aspect, the invention provides a control system configured for a manufacturing device according to any one of the above embodiments, wherein the control system is configured for controlling the manufacturing device for carrying out the manufacturing method according to any one of the above embodiments. Preferably, the control system includes the control unit defined above.

The cell component de-stacking device preferably has the control unit, which is configured for controlling the cell component de-stacking device for carrying out the cell component de-stacking method according to any one of the above embodiments.

The manufacturing device preferably has the control system according to any one of the above-mentioned embodiments.

In contrast to the devices and methods according to source [5], first cell components, in particular BPPs, are inserted in single-type form into the vertical de-stacker in embodiments of the invention, wherein that is then placed on the stacking device. The second cell components, in particular MEAs, are inserted into the stacking device only then the first cell components are de-stacked from this vertical de-stacker, by being inserted between the vertical de-stacker and the stacking device.

The vertical de-stacker is pre-filled with the first cell components, in particular BPPs, so that the delivery unit is not used during the actual formation of the fuel cell layer structure. In particular, the delivery unit is separately arranged so that the vertical de-stacker can be loaded separately. Significant cycle time optimization and improvements of the manufacturing sequence can be achieved by this separation.

In contrast to the method of source [5], the first cell components, in particular BPPs, are not thrown in laterally in preferred embodiments of the cell component de-stacking device, but vertically moved into the vertical magazine, in particular lifted from the cycled feed conveyor, when the vertical magazine is filled from a cycled feed conveying means, in particular a feed conveyor. Thus, the dangers of damaging the BPPs when they are thrown in, in particular due to mechanical load on the edges when impacting, and when they are sliding, due to the relative movement between the carriers of the feed system of [5], are avoided. When the cell components are inserted in [5], a relative movement of the edges of the cell components with carriers of the feed system is produced. In the embodiments of the vertical de-stacker, the lifting and lowering device gently acts on the first cell components from below or above with carriers, without relative sliding.

In embodiments of the invention, a vertical de-stacker is provided as a mobile, transportable system with a separate filling station. If the feed of the first cell components is limiting time factor in the manufacture of the fuel cell layer structure, the cycle time potential can be multiplied in preferred embodiments of the cell component de-stacking device by expanding the filling strategy from sequential to parallel-sequential with a parallel filling of several vertical de-stackers, without having to parallelize the entire system. Thus, an increase of the production capacity can be achieved with little expenditure and low costs.

In preferred embodiments of the invention, a BPP feed system is realized as a single-type system. Thus, an NOK strategy with a high cycle time potential and high process reliability, which is isolated from the actual stacking process, can be realized already when loading the vertical de-stacker. Thus, upsets to the stacking process by NOK components are avoided; such components are not present in the stacking process.

In preferred embodiments of the cell component de-stacking device, the first cell components are subjected to a first pre-alignment already when loading the vertical de-stacker. This increases process reliability and increases the cycle time potential, particularly by reducing the depositing time.

In embodiments of the cell component de-stacking device, the feed of the first cell components is not bound to a type of material feed. Irrespective of the material feed, the first cell components are disposed on the delivery device, in particular a filling conveyor, and fed to the vertical de-stacker in a defined manner A material supply of the first cell components in a special magazine is an absolute requirement in [5]. In contrast thereto, in preferred embodiments of the cell component de-stacking device, the first cell components, in particular BPPs, can be processed both from magazines—e.g., by removing the BPPs from magazines with a multiple gripper and subsequently depositing them on the BPP feed conveyor—and with a direct conveyor interlink with the BPP production.

Particularly in the case of a direct conveyor interlink, no intermediate layers between the BPPs are required, which constitutes a considerable advantage with regard to costs and the environment.

Advantageous embodiments of the invention thus provide a system that is better suited to future applications and larger output quantities.

Even though the preferred use lies in the manufacture of layer structures for fuel cells, some embodiments of the devices and apparatuses for stacking or de-stacking may be suited, and also used for, stacking or de-stacking components of other layer structures, such as battery cells or the like. In addition to the first and second cell components, the alternating layer structure of a first and a second cell component may of course also contain still more cell components. For example, the first and second cell components are also alternately arranged in an alternating layer structure consisting of a first to fourth cell component; a third and fourth cell components may also be arranged therebetween.

BRIEF DESCRIPTION OF THE DRAWINGS

Preferred embodiments of the invention will be explained below in more detail with reference to the attached drawing. In the Figures.

DETAILED DESCRIPTION OF THE PREFERRED EMBODIMENTS

Figure 1:
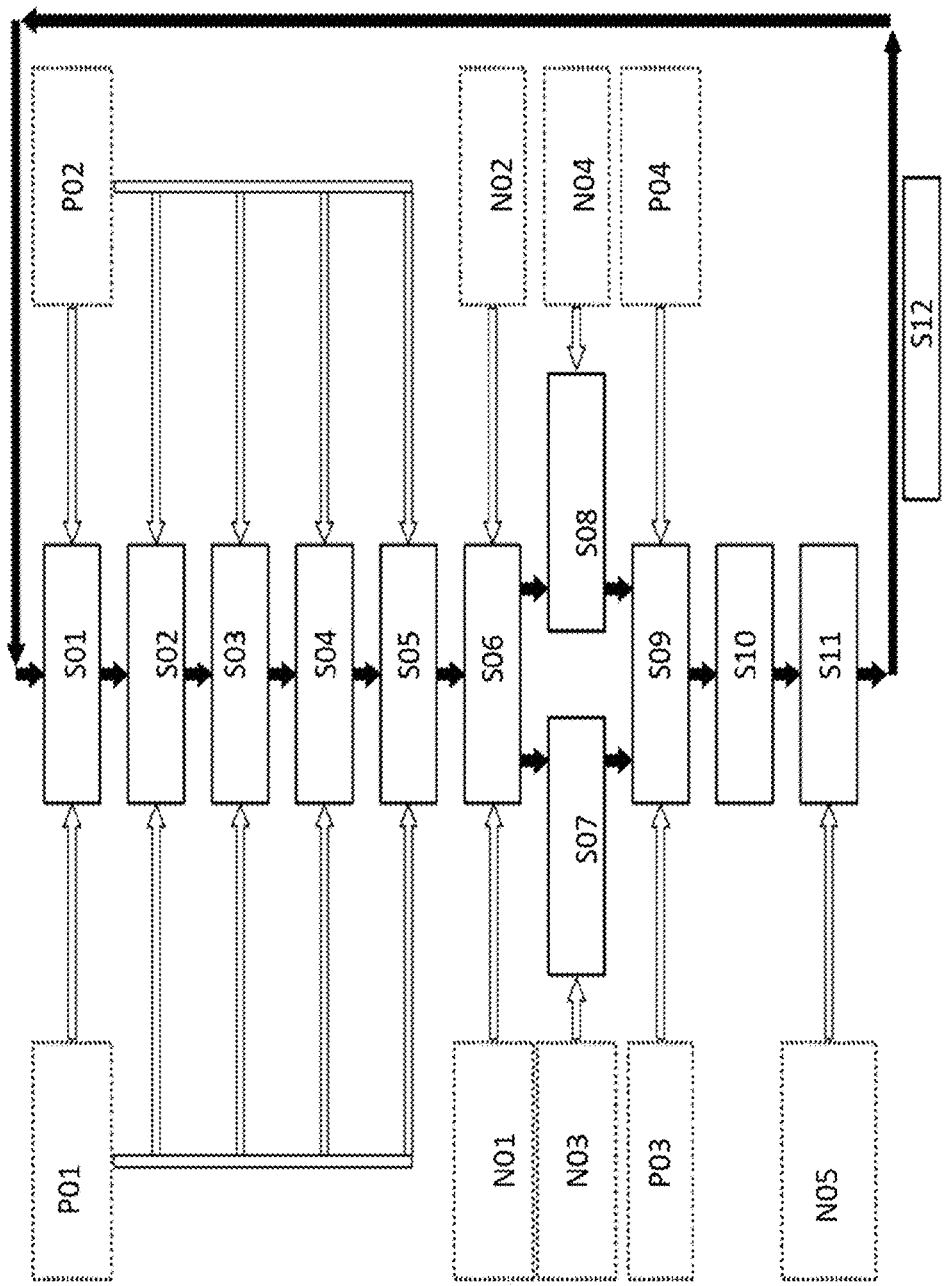
FIG. 1 shows a schematic process chart of an exemplary embodiment of a manufacturing method for manufacturing a fuel cell layer structure with alternately arranged first and second cell components configured in a plate-like or membrane-like manner.

An exemplary embodiment of a manufacturing method for manufacturing a fuel cell layer structure is shown as a process chart in FIG. 1. FIGS. 2 to 6 show exemplary embodiments of a manufacturing device 10 for carrying out the manufacturing method. The manufacturing device 10 has at least one stacking station 12, which is shown in FIGS. 2 and 4 to 6 and at which the fuel cell layer structure 14 is constructed alternately at least from first cell components 16 and second cell components 18. Preferred embodiments of the manufacturing device 10 further include at least one filling station 20 shown in FIG. 3. FIGS. 3, 8, 13 and 14 show exemplary embodiments of a cell component de-stacking device 22 for use in the manufacturing method, in order to provide first cell components 16 at the stacking station 12 of the manufacturing device 10. The other Figures show different details and units of the cell component de-stacking device 22.

The cell component de-stacking device 22 is configured for vertically de-stacking separated first cell components 16 at the stacking station 12 of the manufacturing device 10 in the course of manufacturing the fuel cell layer structure 14. To this end, the cell component de-stacking device 22 is also configured for forming a stack of first cell components 16, from which the first cell components 16 are de-stacked in a separated manner at the stacking station 12.

The cell component de-stacking device 22 has at least one vertical de-stacker 24 and a delivery device 26.

Figure 6:
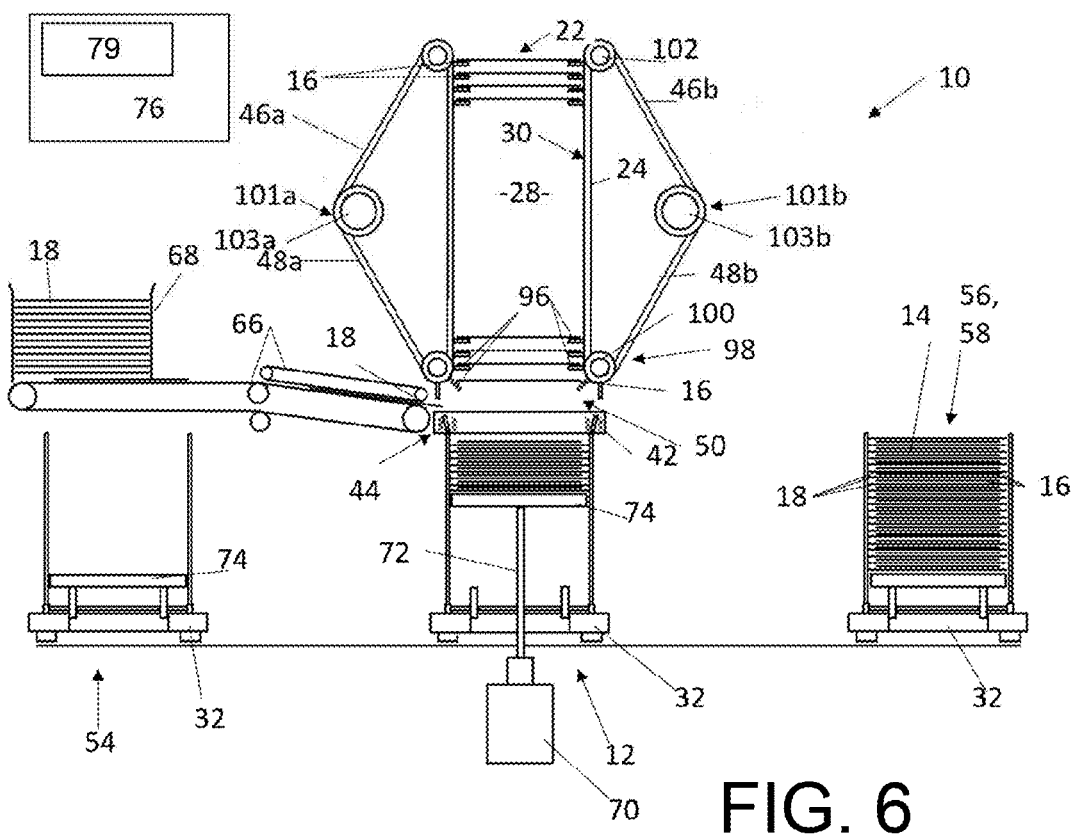
FIG. 6 shows a lateral schematic illustration of the manufacturing device for illustrating the principle of the feed of the first cell component.
Figure 7:
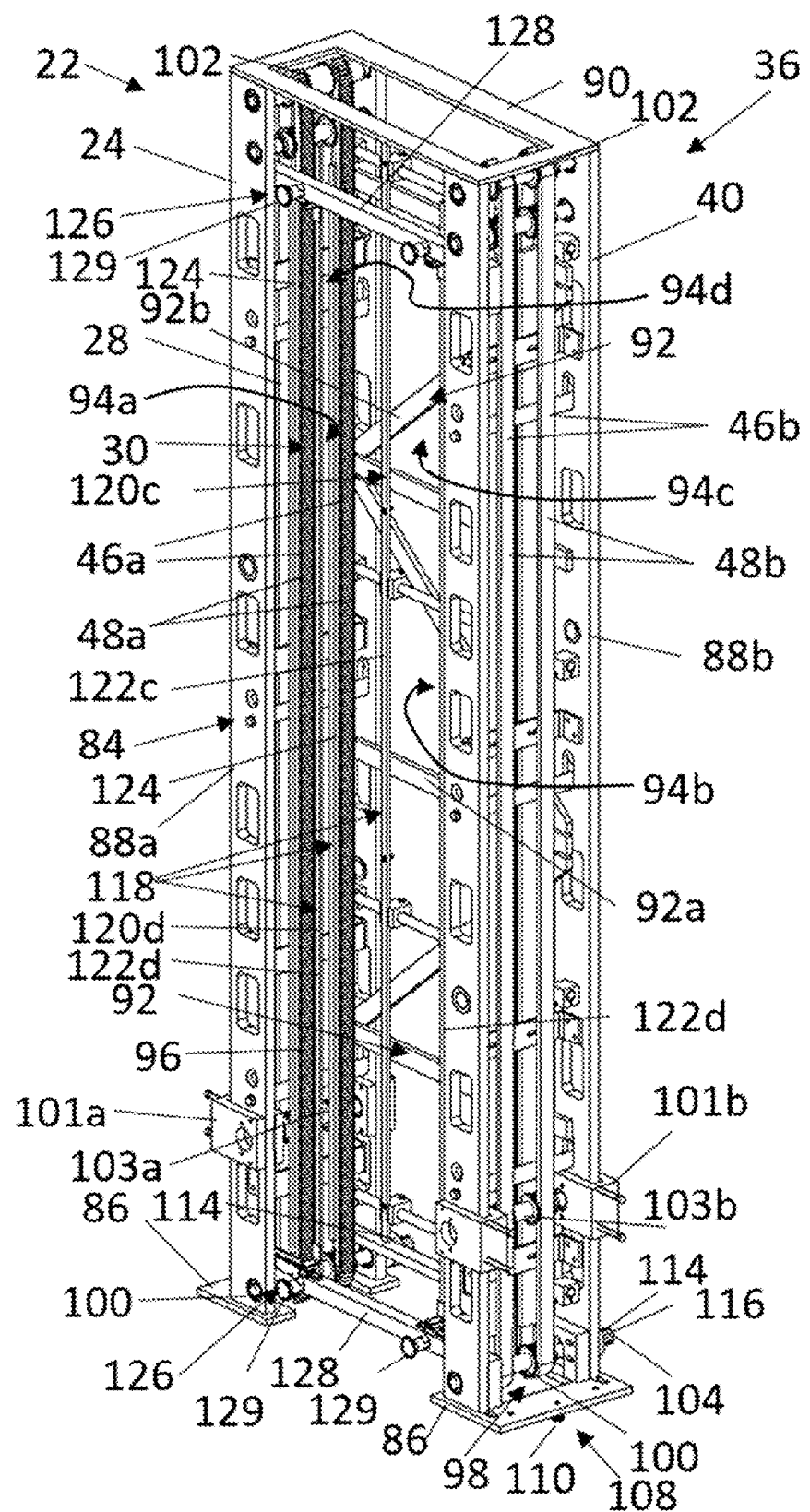
FIG. 7 shows a perspective view of an exemplary embodiment of a vertical de-stacker to be used in the manufacturing device and the cell component de-stacking device.

The vertical de-stacker 24, of which a schematic illustration together with the manufacturing device 10 is shown in FIG. 6, and of which a preferred exemplary embodiment is shown in FIG. 7, has a vertical magazine 28 for accommodating a plurality of the first cell components 16 in a vertical arrangement and a lifting and lowering device 30 for lifting and lowering the first cell components 16 in the vertical magazine 28 and for de-stacking separated first cell components 16 in the vertical direction. In a preferred embodiment, the lifting and lowering device 30 has at least one conveying means 48.

The delivery device 26 is disposed at the filling station 20 and serves for delivering separated first cell components 16 to the vertical de-stacker 24 at the filling station 20.

The at least one vertical de-stacker 24 is configured for filling the vertical magazine 28 at the filling station 20 by individually accommodating the first cell components 16 and moving them by means of the lifting and lowering device 30.

The vertical de-stacker 24 is further configured for being moved between the filling station 20 and the stacking station 12 and for individually dispensing the first cell components 16 in the vertical direction at the stacking station 12 by means of a downward movement.

As is apparent from FIGS. 2 and 4 to 6, the manufacturing device 10 has at least one stacking device 32 for stacking the first cell component 16 and the second cell component 18 on top of one another in an alternating manner. The stacking device 32 is configured for being positioned in a stacking position at the stacking station 12. In preferred embodiments of the manufacturing device 10, several stacking devices 32 are provided in order to form a loop. In a particularly preferred embodiment, the manufacturing device 10 has a plurality of stacking devices 32 that can be moved in a loop between the stacking station 20 and at least one further processing station for further processing the fuel cell layer structure stacked in the stacking device 32.

Furthermore, the manufacturing device 10 comprises the at least one vertical de-stacker 24, which can be moved between the filling station 20 and the stacking station 12, for de-stacking separated first cell components 14 in the vertical direction to the stacking device 32. Preferably, several vertical de-stackers 24 are provided in order to form a loop. A preferred embodiment of the manufacturing device 10 has a plurality of vertical de-stackers 24 that can be moved in a loop between an accommodating unit 50 at the stacking station 12 and at least one accommodating unit 52 or several accommodating units 52a-52d at the filling station 20.

The manufacturing device 10 further comprises a lateral feed system 34 for laterally feeding separated second cell components 18 to the stacking device 32.

For example, cell stacks of fuel cells, which are formed of alternatively stacked first and second cell components 16, 18, are manufactured with the preferred embodiments of the manufacturing method and the manufacturing device 10. Bipolar plates, abbreviated BPPs 17, are examples of the first cell components 16, and membrane electrode assemblies, abbreviated MEAs 19, are examples of the second cell components 18, see sources [1] to [4] for further details.

A BPP feed system 36 for feeding bipolar plates is described below as a preferred exemplary embodiment of the cell component de-stacking device 22. At the filling station 20 as an example of the delivery device 26, it has a BPP feed conveyor 38 and the at least one vertical de-stacker 24, in this case in the form of a belt de-stacker 40 for BPPs 17, for instance, which is movable between the filling station 20 and the stacking station 12.

For example, the cell component de-stacking device 22 is a device for introducing BPPs 17 into the stacking process of a PEMFC.

An overall process for manufacturing the fuel cell layer structure 14 is described below with reference to the illustration in FIGS. 1 to 6, before preferred specific embodiments of the cell component de-stacking device 22 and a cell component de-stacking method that can be carried out therewith are explained with reference to FIGS. 7 to 14.

An advantageous embodiment of the overall process according to FIGS. 1 to 6 is a manufacturing method for manufacturing a fuel cell layer structure in the form of a polymer-electrolyte membrane fuel cell stack, abbreviated PEMFC stack. Such fuel cell layer structures and their components are known from the sources [1] to [4], for example, so that reference may be made thereto for details. The manufacturing method is explained below with reference to the illustration in FIGS. 1 to 6.

In the manufacturing process of the PEMFC stack, first, the lower end component/end components are inserted into the stacking device 32 (S01). The stacking device 32 is a system which accommodates the alternately inserted repeating components BPPs 17 and MEAs 19 (examples of first and second cell components 16, 18), aligns them and guides them in a stationary manner for the other subsequent processes, within the predefined positional tolerances.

After the end component/end components have been positioned and fixed (S02), the guide system 42 (S03) is mounted and the stacking device 32 is transported (S04) to the stacking position of a stacking station (example of the stacking station 12). The end component/end components are located in the starting position (upper stop in the stacking device 32)—S05.

During the process of preparing the stacking device 32, a filled vertical de-stacker 24 of the BPP feed system 36 was, directly and in parallel, transported from the loading station or filling station 20, or from a buffer station (which is not shown), into the stacking station 12 (stacking station) (P01) and aligned and fixed above the stacking position (N01).

In analogy with the BPPs 17, the storage magazine 68 of a friction feeder 66 (feeder—example of a lateral feed system 34) was filled with MEA components (example of the second cell component 18) (P02, N02) during the process of preparing the stacking device 32. Thus, the preparation of the overall process is completed and the PEMFC stack can be erected (S06-S11 and FIG. 6).

As is shown in FIGS. 1 and 6, in alternation, MEA components—second cell components 18—are laterally inserted into the stacking device 32 by the friction feeder 66 (S07), and BPP components—first cell components 16—are vertically inserted therein from above (S08) by the vertical de-stacker 24 of the BPP feed system 36. An alignment, primarily of the MEA components due to the lateral insertion and the change of the direction of movement from the horizontal to the vertical, is carried out by the guide system 42 of the stacking device 32 (S10). Because of the exclusively vertical depositing movement of the BPPs 17, only very little effort for alignment/positioning is required in comparison with the MEAs 19. Thus, the overall cycle time for depositing an individual cell consisting of BPPs 17 and MEAs 19 can be proportionately distributed amongst the respective components due to the structure of the individual systems (N04). If required, it is thus possible, for example, to allocate a greater proportion of the cycle time to depositing the MEA if the process requires more time.

Figure 2:
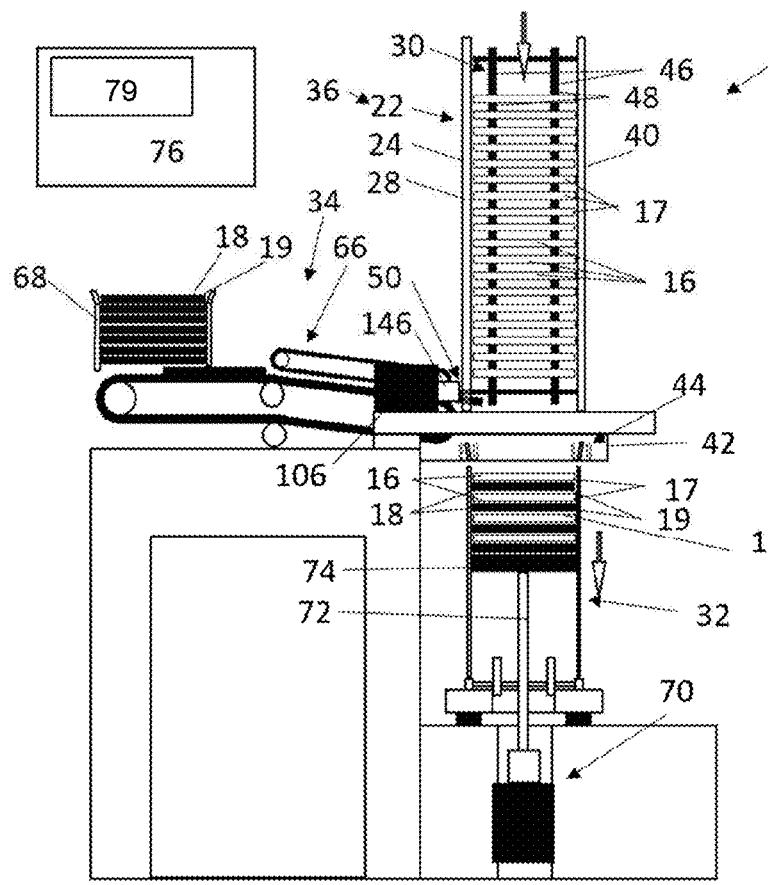
FIG. 2 shows a schematic side view of an exemplary embodiment of a manufacturing device for manufacturing a fuel cell layer structure.

In addition, the depositing process may optionally be supported by vibration in the depositing area (P03), if necessary, whereby the alignment of the most recently deposited components is simplified. To this end, a vibrating device 44 is provided on the guide system 42 of the stacking device 32—as is shown in FIGS. 2 and 6. For more details pertaining to the alignment of cell components 16, 18 by vibration, reference is made to source [7]. The use of vibration for the alignment of components both in the manufacture of lithium-ion battery cells and for the manufacture of fuel cell stacks (PEMFC stacks) was described therein. A possible exemplary embodiment of the stacking device 32 itself is described and shown in source [8].

As the PEMFC stack grows progressively, the stacking device 32 adjusts the level in order to keep the depositing position of the repeating components—the first and second cell components 16, 18—constant during the entire stacking process (P04). For this purpose, the manufacturing device 10 according to FIGS. 2 and 6 has a lifting actuator 70 with a push rod 72 that can be moved up and down, by means of which a base plate 74 of the stacking device 32 positioned at the stacking station 12 can be moved in the vertical direction. For example, the lifting actuator 70 is a stepping motor with a threaded nut engaged with a threaded portion of the push rod 72 configured as a threaded rod.

As a consequence of the weight and the resulting adherence of the individual plies to one another, it is not intended to subsequently align the repeating components 16, 18 (BPP 17 and MEA 19) after the completion of the stacking process (S10), due to the potential risk of damage.

In the exemplary embodiment shown, other subsequent processes (S11) for finishing the PEMFC stack are provided after the completion of the stacking process. These subsequent processes are carried out at different positions, for which purpose a transport (N05) of the stacking device 32 from the stacking position is provided. This transport of the stacking device 32 continues until the manufacturing process is completed and the PEMFC stack is removed. Then, the stacking device 32 is subsequently transported back to the process start and again prepared for compiling another PEMFC stack. Thus, the stacking device 32 is located within a closed loop system (S12) in the manufacturing method of a PEMFC stack.

FIG. 1 shows a process chart for an exemplary embodiment of the above-described manufacturing method of a PEMFC stack (example of a fuel cell layer structure). The labels presented therein mean:

H Main process (the steps of the main process are depicted in boxes with a solid border);
N/P Secondary process/parallel process (steps of a secondary process/parallel process taking place in parallel during the main process are depicted in boxes with a dotted border);
S01 Insert lower end component into stacking device;
S02 Fix lower end component in stacking device;
S03 Position guide system for repeating components;
S04 Transport stacking device to stacking position;
S05 Lower end component in starting position;
S06 START STACKING PROCESS;
S07 Lateral insertion of MEA by feeder;
S08 Vertical insertion of BPP by BPP feed system;
S09 Alignment of MEA and BPP with guide system;
S10 STOP STACKING PROCESS;
S11 SUBSEQUENT PROCESSES;
S12 Loop of stacking devices;
P01 Parallel process: Insertion of filled vertical de-stacker of BPP feed system into stacking station;
P02 Parallel process: Insertion of MEAs into a storage magazine of a feeder;
P03 Parallel process: If necessary, support of alignment process by means of vibration;
P04 Parallel process: Adjustment of level of stacking device for constant depositing position;
N01 Vertical de-stacker aligned and fixed above stacking position and ready for separation;
N02 MEA storage magazine filled in defined manner, MEAs positioned and ready for separation;
N03 Alternating insertion of BPP and MEA up to reaching the required cell number;
N04 Variation of cycle time between MEA insertion and BPP insertion possible;
N05 Transport of stacking device from stacking station, transport of stacking device to subsequent processes.

Figure 3:
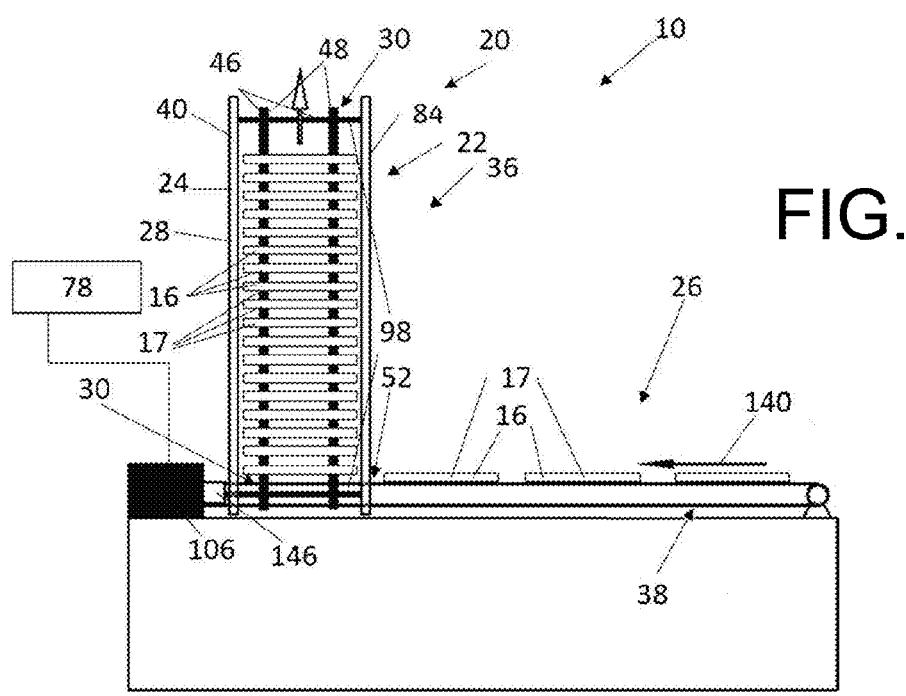
FIG. 3 shows a schematic side view of an exemplary embodiment of a cell stacking device for use in the manufacturing method of FIG. 1.

The manufacturing device 10 has a control system 76, which is indicated in FIGS. 3 and 6 and which controls the manufacturing device 10, more specifically its actuators, drive units, coupling devices, transporting systems etc., in order to carry out the manufacturing method shown in FIG. 1. The control system 76 comprises a control unit 78, which in the process controls the cell component de-stacking device 22, more specifically its actuators, drive units, coupling devices, transporting systems etc., in order to carry out the cell component de-stacking method to be carried out in the course of the manufacturing method (includes filling the vertical de-stacker 24 and de-stacking the first cell components 16 at the stacking station 12). For this purpose, the control system 76 has a computer program with the corresponding control instructions. The control unit 78 may also be implemented by software.

Figure 4:
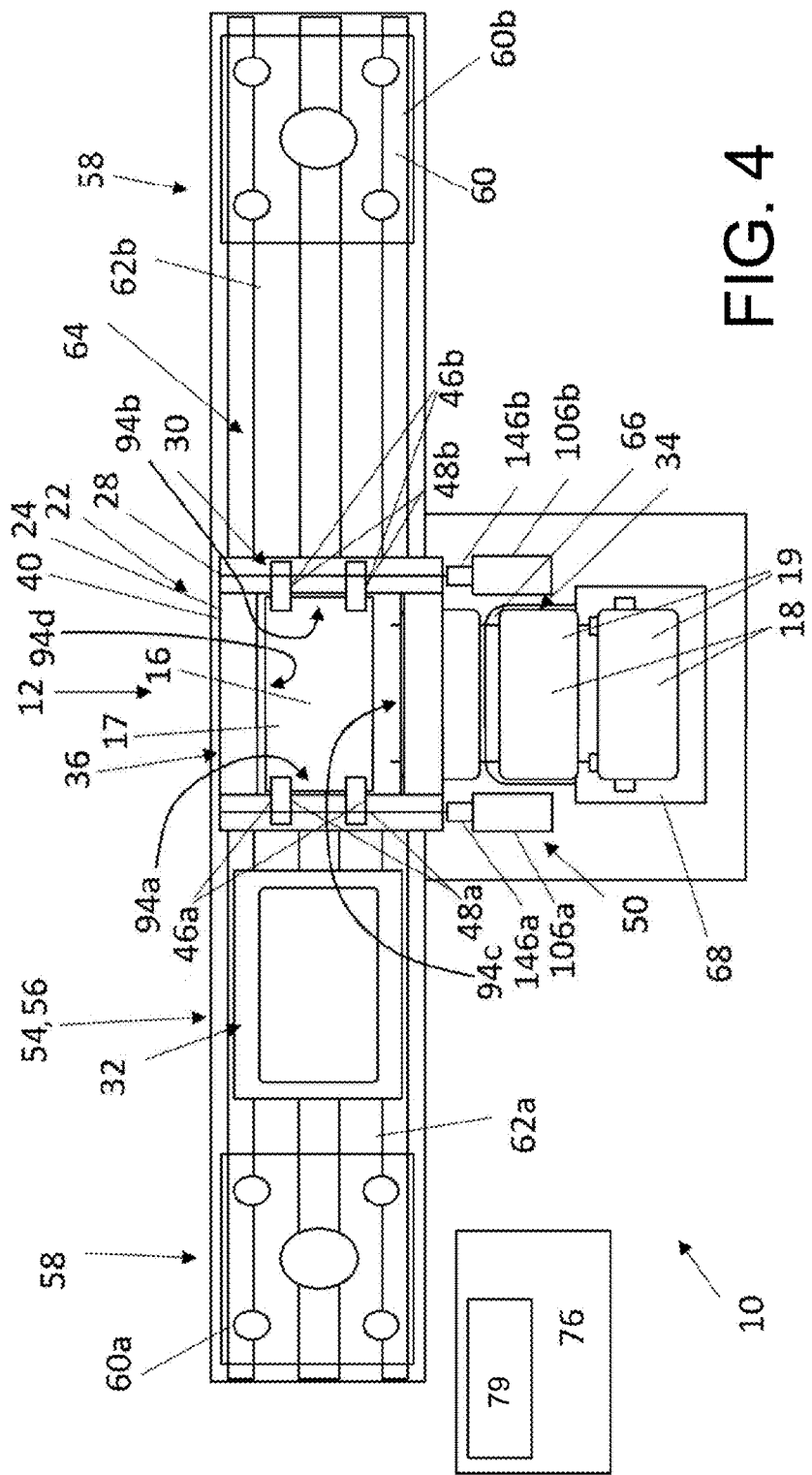
FIG. 4 shows a schematic plan view of an exemplary embodiment of the manufacturing device for illustrating a possible combined station for manufacturing the fuel cell layer structure.
Figure 5:
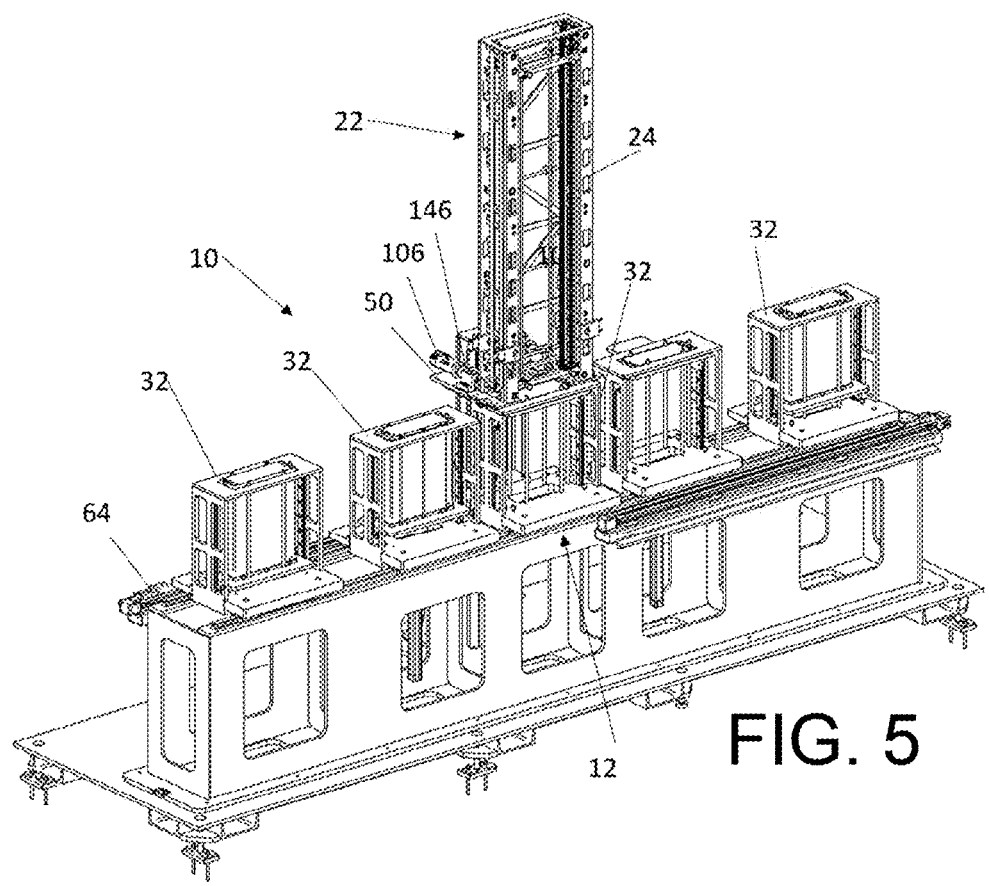
FIG. 5 shows a perspective illustration of a specific exemplary embodiment of the manufacturing device

FIGS. 2 to 6 show exemplary embodiments of devices and apparatuses for carrying out the entire manufacturing process of a PEMFC stack, which is presented in FIG. 1 and schematically explained above, and they will now be described in detail. FIG. 2 shows a schematic illustration of the overall system—exemplary embodiment of the manufacturing device 10. In particular, FIG. 2 shows a schematic illustration of the overall system for manufacturing a PEMFC stack (with the exception of the filling station 20). FIG. 3 shows a schematic illustration of an exemplary embodiment of the filling station 20. In particular, FIG. 3 shows a schematic illustration of a BPP filling station for loading a vertical de-stacker 24 of the BPP feed system 36. FIG. 4 shows a plan view of an embodiment of the overall system—example of the manufacturing device 10 (with the exception of the filling station 20). In particular, FIG. 4 shows a plan view of a possible combined station for manufacturing a PEMFC stack. FIG. 5 shows a perspective illustration of some units of the combined station in a more detailed exemplary embodiment. FIG. 6 shows a schematic illustration of the stacking process. In particular, FIG. 6 shows the illustration of the principle of the BPP feed into the stacking device 32, particularly by carrier-equipped toothed belts 46 (example of conveying means 48) of the BPP feed system 36 (more specifically of the belt de-stacker 40).

According to FIGS. 2 to 6, the embodiment of the manufacturing device 10 shown here comprises at least the filling station 20 shown in FIG. 3 and the stacking station 12 shown in FIGS. 2 and 4 and 5.

According to the embodiment shown in FIGS. 4 and 5, the manufacturing device 10 may have a depositing station 54 for depositing end components of the cell layer structure at the stacking device 32. According to the embodiment shown in FIGS. 4 and 5, the manufacturing device 10 may also have a removal station 56 for removing the fuel cell layer structure from the stacking device 32. In the embodiments shown in FIG. 4, the depositing station 54 and the removal station 56 are provided in a combined form as a depositing and removal station 54, 56, but may also be provided separately. According to the embodiment shown in FIGS. 4 and 5, the manufacturing device 10 may have at least one pressing station 58 with at least one pressing machine 60 for pressing the fuel cell layer structure 14. A first and a second pressing machine 60a, 60b, which can be moved by means of associated transporting systems 62a, 62b, are provided in the embodiment shown. The pressing station 58 is an example of a station for carrying out a subsequent process. The depositing of an upper end component (or of several upper end components) on the stack of first and second cell components 16, 18 at the depositing station is also an example of a subsequent process. Other possible subsequent processes are easily apparent to the person skilled in the art from the sources [1] to [4].

As shown in FIGS. 5 and 6, the manufacturing device 10 may further include the stacking device transporting system 64 for transporting the stacking devices 32 between the depositing station 54, the stacking station 56 and the pressing station 58.

FIGS. 2, 4 and 5 also show the accommodating unit 50 of the stacking station 12 for accommodating in a positioned manner the vertical de-stacker 24 in the appropriate position above the stacking position. The accommodating unit 50 has at least one or several actuators or drive units (e.g., stepping motors) 76 for driving the lifting and lowering device 30 and a coupling device 79 for coupling a transmission (explained in more detail below) of the lifting and lowering device 30 of the vertical de-stacker 24 therewith.

The filling station 20 shown in FIG. 3 has the delivery device 26, which also has at least one accommodating unit 52, 52a-52d for accommodating the vertical de-stacker 24 in a positioned manner. This accommodating unit 52, 52a-52d also has at least one or several actuators or drive units (e.g., stepping motors) 76 for driving the lifting and lowering device 30 and a coupling device 79 for coupling a transmission (explained in more detail below) of the lifting and lowering device 30 of the vertical de-stacker 24 therewith.

Exemplary embodiments of the cell component de-stacking device 22 are explained in more detail below with reference to the illustration in FIGS. 6 to 14. The focus of the following description of advantageous embodiments of the cell component de-stacking device 22 is directed toward the feed of the BPPs 17 in the manufacturing or stacking process of a PEMFC stack (example of a cell layer structure or fuel cell layer structure).

In current practice, the feed of the BPPs 17 into the stacking process or the stacking device 32 of the automated stack assembly most frequently takes place by means of a removal from magazine-like storage containers, or by transferring the BPPs 17 from a feed conveying means, particularly a feed conveyor, by means of a pick & place operation. In internal previous solutions, this pick & place operation of the BPPs 17 was carried out, for example, by gripper systems adapted to the components in combination with linear gantry robots or robot systems.

The continuously increasing demand for fuel cells results in the demand for a reduction of the cycle time of the stacking process.

Moreover, it is desirable, in analogy therewith, to meet the increasing demand for repeating components and to realize their feed into the stacking process with the appropriate speed.

In the case of a feed of the BPPs 17 from the storage magazines into the stacking device by means of a pick & place operation (robot, linear gantry robot), this process frequently determines the cycle time limit of the stacking process.

In addition, when using magazine-like storage containers, intermediate plies are frequently needed in practice in order to protect the stacked BPPs 17 against mutually damaging one another. These intermediate plies have to be separated from the BPPs 17, collected and the prepared for reuse or disposal by an additional process.

In addition, the pick & place process cannot be accelerated indefinitely, so that an increase in the output of the overall system requires a parallelization of the BPP handling system or a parallelization of the overall system.

At present, the minimum cycle time of a pick & place handling process for depositing a single BPP 17 is considered to be about one second.

In addition, the number of BPPs 17 per transporting process in a pick & place operation is limited, and most frequently is limited to the transport of a single component.

By using multiple grippers, there is also the option of picking up and transporting a certain number of BPPs 17 per transport cycle. However, the correspondingly more complex pickup process and the larger inertia of the gripper results in a reduction of the process dynamics, whereby the number of transported BPPs 17 is again limited.

As a result of the process, large transport distances have to be covered during the stacking process due to the pick & place process, whereby the risk of positional deviations and damage to the components increases in addition to the cycle time limitation.

Replacing/Modifying the Cycled Pick & Place Process:

Advantageous embodiments of the cell component de-stacking device 22 and the cell component de-stacking method that can be carried out with it are based on the idea of replacing the previous pick & place process for the feed of the BPPs 17.

The system for the BPP feed described herein—the BPP feed system 36—reduces the transport distances of the BPPs 17 from the delivery position of the material feed to the depositing in the stacking device 32, which results in radical improvements with regard to the cycle time potential, depositing accuracy and process reliability.

Adaptability to the Delivery System of the BPPs:

So far, no uniform system for delivering the BPPs 17 from the BPP manufacturing process to the stacking process of the PEMFC stack is provided. Most frequently, the BPPs 17 are currently provided in magazines, separated from one another by intermediate plies.

As the demand for PEMFC stacks increases, however, a system based on a direct interlink for coping with the necessary individual parts is expected for the future.

For example, a removal of the BPPs 17 from the BPP magazines by a robot/gripper system, which are then deposited on a filling conveyor 82 (or similar conveying means) of the delivery device 26 of the BPP feed system 36, is considered an interim solution in this case.

During the transport of the deposited BPPs 17 in the direction of the vertical de-stacker 24 of the BPP feed system 36, a first rough alignment is advantageously carried out by means of a laterally mounted mechanical guide system 80 for the subsequent lifting process.

Thus, embodiments of the invention may also be used as intermediate/interim solutions between the magazine-based feed and the direct interlink. Thus, the system core may remain unchanged.

Preferred embodiments of the invention, when applied to PEMFC production, have one or several of the following advantages:

Replacement of the pick & place operation in the feed of the BPPs 17 into the stacking process Development of a BPP feed system 36 with a high cycle time potential Realization of a continuously adjustable system speed in order to implement a scalability with regard to the output quantity Enabling the implementation of the ramp-up with the same BPP feed system 36

Realization of a variable system with regard to the BPP format size, BPP material and the cell number of the PEMFC stack to be fabricated (minimum number of BPPs 17 to be accommodated)

Reduction of the required number of handling steps from BPP fabrication to depositing the BPPs 17 in the PEMFC stack This results in an increase in depositing accuracy Enhancement of component protection during transport and depositing during stack formation Enhancement of process reliability Simplification of the stacking device with regard to component positioning Reduction of rejects quantity Reduction of production costs of a PEMFC stack Realization of the ramp-up for PEMFC vehicles/applications No need for intermediate plies for protecting the BPPs 17 within the feed system Reduction of material costs (plastic film)

Reduction of waste (environment/disposal costs)

Even though embodiments of the cell component de-stacking device 22 are explained based on the example of a BPP 17 as cell component to be supplied, the principles are of course applicable to any other plate-like or membrane like cell components of a cell layer structure (e.g., battery cells, . . . ).

Preferred embodiments of the cell component de-stacking device 22 exploit the idea of accommodating all BPPs 17 required for building a PEMFC stack, pre-positioning them and depositing them via the stacking device 32 on the growing PEMFC stack, instead of, as is the case at present, removing the BPPs 17 individually from a BPP storage magazine by a pick & place operation using a robot gripper system, transporting them via the stacking station and depositing them on the PEMFC stack after completing alignment processes for correcting positional errors.

FIG. 7 shows an exemplary embodiment of the vertical de-stacker 24 of the cell component de-stacking device 22, using a BPP feed system 36 as an example.

FIG. 7 shows the vertical de-stacker 24 with the vertical magazine 28 for accommodating a plurality of the first cell components 16 in a vertical arrangement and with the lifting and lowering device 30 for lifting and lowering the first cell components 16 in the vertical magazine 28 and for de-stacking separated first cell components 16 in the vertical direction.

The vertical de-stacker 24 has a self-supporting housing or frame structure 84. In the exemplary embodiment shown, the housing or frame structure 84 has a base plate 86 at the lower end, several vertical frame beams, e.g., in the form of a first and second bearing shield 88a, 88b, an end plate 90 at the upper end and several reinforcing means 92, e.g., in the form of preferably detachably mounted transverse reinforcing means 92a and non-detachably mounted diagonal reinforcing means 92b.

Due to the self-supporting housing or frame structure 84, the vertical de-stacker can be easily transported and positioned, manually or using suitable transporting systems not shown, e.g., robot arms, gantry systems or the like, between the accommodating units 52, 52a-52d of the filling station 20 and the at least one accommodating unit 50 of the stacking station.

The housing or frame structure 84 is configured such that the vertical magazine 28 has a substantially cuboid configuration.

The lifting and lowering device 30 is disposed at a first vertically extending side 94a and an opposite second vertically extending side 94b of the vertical magazine 28.

The lifting and lowering device 30 has at least one first conveying means 48a movable in the vertical direction at a first side 94a of the vertical magazine 28 and at least one second conveying means 48b synchronously movable in the vertical direction at the second side 94b. The conveying means 48*a*, 48*b* each have a row of gripping members 96 as carriers for gripping and holding the first cell components 16. To this end, the conveying means 48*a*, 48*b* are configured as toothed belts 46, at whose side facing towards the inside of the vertical magazine 28 the gripping members 96 are formed. Thus, the vertical de-stacker 24 has at least one first toothed belt 46*a* movable in the vertical direction at the first side 94*a* and at least one second toothed belt 46*b* synchronously movable in the vertical direction at the second side 94*b*. In the configuration shown, two first toothed belts 46*a* are arranged next to each other on the first side 94*a*, and also, two second toothed belts 46*b* are arranged next to each other on the second side 94*b*.

In order to move the conveying means 48*a*, 48*b*, the vertical de-stacker 24 has a transmission 98 that comprises one drive shaft 100 and one return shaft 102 for each side 94*a*, 94*b*. In the embodiment shown, the drive shaft 100 is mounted on the housing or frame structure 84 at the lower end, and the return shaft 102 at the upper end. Moreover, a first tensioning unit 101*a* with a first tensioning shaft 103*a* is provided on the first side 94*a*, and a second tensioning unit 101*b* with a second tensioning shaft 103*b* on the second side 94*b*, in order to tension the conveying means 48*a*, 48*b*.

In an embodiment not shown, the vertical de-stacker 24 has an actuator on the drive shaft 100 for driving the lifting and lowering movement. In this case, terminals, e.g., contacts, for controlling and supplying the actuator are provided on the respective accommodating unit 50, 52*a*-52*b*.

In the preferred embodiment shown, the vertical de-stacker has on the drive shaft 100 a coupling device (or part thereof) or a coupling end 104 for coupling therewith an actuator 106 (depicted in FIGS. 8, 10 and 11) provided on the accommodating unit 50, 52*a*-52*d* for driving the lifting and lowering movement.

The vertical de-stacker 24 further has a positioning device 108 for positioning the vertical magazine 28 at the filling station 20 and/or at the stacking station 12. In the exemplary embodiment shown, the positioning device has a register pin 110 for engagement with a corresponding positioning opening 112 (shown in FIG. 11) on the accommodating unit 50, 52, 52*a*-52*d*.

The vertical de-stacker 24 further has a braking system 114 for braking at least the downward movement of the cell components in the vertical magazine. In the embodiment shown, a friction brake 116, which is biased into its braking position and is brought into its release position when connected to the actuator 106, is provided on the drive shaft 100.

The vertical de-stacker 24 further has at least one abutting and/or guiding device 118 for positioning and/or guiding the cell components during filling and/or lifting and lowering.

In a preferred embodiment, the vertical de-stacker 24 has a vertical guiding device 118, which is funnel-shaped in at least some areas, for positioning the cell components 16 in the delivery direction.

In the embodiment shown, the abutting and/or guiding device 118 has, at a rear third side 94*c* of the vertical magazine 28, a rear guide system 120*c* with two vertically extending guide rods 122*c*, against which the inserted cell components 16 abut. Moreover, guide rails 124 for laterally guiding the cell components 16 during the vertical movement are provided on each of the first and second sides 94*a*, 94*b*. The abutting and guiding device 118 has at the front fourth side 94*d* a front guide system 120*d* with front guide rods 122*d* for guidance from all sides 94*a*-94*d*.

The vertical de-stacker 24 further has a closure system 126 for disengageably fixing at least a part of the abutting and/or guiding device 118. In the exemplary embodiment shown, the front guide rods 122*d* are attached to the crossbars 128 that are detachably attached to the bearing shields 88*a*, 88*b* by spring-biased engaging members 129 that can be manually retracted for disengaging.

Thus, at least one abutting or guiding device 118, against which the cell components 16 accommodated in the vertical magazine 28 abut, is removably disposed at a third 94*c* and/or fourth 94*d* vertically extending side extending transversely to the first 94*a* and second side 94*b*. The distance between opposite guide rails 124 and guide rods 122*c*, 122*d* may be gradually decreased from the bottom towards the top, at the initial part, in order thus to form the funnel-shaped guiding device 118.

Functions and advantages of the vertical de-stacker 24, particularly when used in the cell component de-stacking device 22 and in the manufacturing device 10, are explained in more detail below. Moreover, an embodiment of a cell component de-stacking method that can be carried out with the cell component de-stacking device 22 is explained below.

The vertical de-stacker 24 of the preferred BPP feed system 36 is an active magazine system, which essentially consists of the vertically movable conveying means 48*a*, 48*b*, which are mounted on the self-supporting housing or frame structure 84, with the gripping members 96, such as four modified toothed belts 46, 46*a*, 46*b*, for example. In this case, additional elements, the so-called "carriers" or gripping members 106, on which the BPPs 17 are stored, are attached or milled into the rear side of the respective toothed belt 46, 46*a*, 46*b*.

The BPP feed system 36 is preferably loaded by a filling conveyor 82 at an independent loading station—in this case the filling station 20, for example. The filling conveyor 82 is formed on the delivery device 26, which will be described in more detail below with reference to the FIGS. 8 to 14.

The vertical de-stacker 24 of the BPP feed system 36 is preferably positioned in the filling station 20 and the stacking station 12 by means of zero-point clamping systems (example of the positioning device 108 or the accommodating unit 50, 52, 52*a*-52*d* for the vertical de-stacker 24 at the respective station 12, 20). For this purpose, the register pin 110 of the positioning device 108 can be clamped at the positioning opening 112 by means of a clamping system while exactly defining the zero point of the cell component de-stacking device 22.

A collision with the BPPs 17 situated on the filling conveyor 82 when inserting the vertical de-stacker 24 into the filling station 20 is preferably prevented by a defined gap on the carrier side of the toothed belt 46.

The BPP 17 is preferably pushed into the intermediate space between two successive "carriers" 96 during the loading process and lifted up by a vertical movement of the belt system (example of the lifting and lowering device 30).

Preferably, the BPPs 17 are pre-positioned on the "carriers" of the toothed belts 46, 46*a*, 46*b* by means of the integrated guide system 118, 120, 122, 124 simultaneously with this lifting movement.

The integrated guide system 118, 120, 122, 124 is preferably adapted to the BPP-specific aligning elements (alignment areas).

The accommodated BPPs 17 are secured against slipping by the toothed belts 46, 46*a*, 46*b* and the guide system 118, 120, 122, 124 during the transport of the completely filled vertical de-stacker 24 from the filling station 20 via the optionally provided "buffer station" (not shown) to the stacking station 12.

The integrated blocking or braking system 114 prevents the unchecked de-stacking of the BPPs 17 due to gravity.

After the vertical de-stacker 24 has been positioned in the stacking station 12 above the stacking device 12, the blocking or braking system 114 is released and the direction of rotation of the drive units is reversed in the opposite direction to the direction of rotation of the loading process, whereby the BPPs 17 are individually inserted into the stacking device 32, one after the other, at the correct point in time.

An increase of the capacity of storable BPPs 17 can be specifically adapted to the respective requirement for the cell number of a PEMFC stack by simply extending the housing or frame structure 84, e.g., by simply extending the bearing shields 88a, 88b using a longer conveying means 48 (toothed belt 46) with a larger number of carriers—gripping members 96.

The preferred embodiments of the cell component de-stacking device 22 and the cell component de-stacking method that can be carried out therewith differ fundamentally from the devices and methods of source [6], in which the essential point is the direct processing of track-shaped cell stack element substrates to form PEMFC stacks (separating and depositing/stack formation of track-shaped cell stack element substrates in a single process step).

However, it is possible to couple the material feed of the BPPs as "rolled goods" described in source [6] in combination with a subsequent separating station for producing separated BPPs and the system of feeding BPPs by means of a belt de-stacker described below. In particular, a conveyor interlink of the filling conveyor 82 with the BPP manufacture is thus possible.

One advantage of preferred embodiments of the cell component de-stacking device 22 is that, in contrast to the known solutions, such as in the pick & place process, the process steps carried out individually, comprised of component removal, component transport, component positioning and component deposition cannot be separately carried out for each individual BPP 17.

The preparation of the BPP feed system 36 with the required total amount of BPPs 17 for building a PEMFC stack is now carried out in a filling station 20 specially designed for this purpose, whereby transport distances, positional deviations, cycle time and risk of damage is radically reduced and separated from the actual stacking process.

At the same time, the BPP feed system 36, due to its construction, permits the deposition of the BPPS 17 with reduced depositing distances, in analogy to loading, whereby deposition tolerances, cycle time and risk of damage are reduced in turn.

Moreover, by using several vertical de-stackers 24 in combination with a delivery device 26 appropriately adapted with respect to length and transport speed, the overall system can be expanded or parallelized without altering the core of the overall system, whereby a parallel-sequential process flow is made possible and a continuous BPP material flow is achieved.

As was already mentioned above, an increase of the capacity of storable BPPs 17 can be specifically adapted to the respective requirement for the cell number of a PEMFC stack by simply extending the bearing shields 88a, 88b using a longer toothed belt 46a, 46b with a larger number of carriers—gripping members 96. Scaling effects of the PEMFC stack in the range of the cell number can thus be implemented easily.

FIG. 7 shows a perspective view of an exemplary embodiment of the vertical de-stacker 24 in the initial state—completely empty. In particular, FIG. 7 shows the structure of the BPP feed system 36, which is configured, for example, with a belt de-stacker 40.

According to FIG. 7, the vertical de-stacker 24 includes two opposing pairs of toothed belts 46a, 46b, which are placed on several toothed-belt shafts—drive shaft 100, return shaft 102. These toothed-belt shafts have different functions and are provided once in each case for each pair of toothed belts.

In the drive shaft 100, several functions for operating the BPP feed system 36 are carried out. This includes the driving of the pair of toothed belts 46a, 46b by, in each case one, flanged drive unit 106a, 106b, in particular a servo drive unit—example of an actuator 106—and the fixing of the pair of toothed belts 46a, 46b by means of the braking system 114 after the completion of the loading process and prior to the subsequent transport to the stacking station 12, whereby an autonomous outputting of the BPPs 17 due to gravity is prevented. The synchronization of the two drive units 106a, 106b and thus of the entire toothed-belt system is carried out by a corresponding control system—which is, in particular, configured as a part of the control unit 78.

The return shaft 102, which in combination with the drive shaft 100 also limits the capacity of BPPs 17, is provided so as to complete the toothed-belt system and permit a circulating system.

The tensioning shaft 103a, 103b together with the tensioning unit 101a, 101b is provided in order to reduce the installation effort of the vertical de-stacker 24 and support a precise and reliable accommodating and depositing process. With this tensioning unit 101a, 101b, a defined tension force is applied to the toothed belts 46a, 46b, whereby the system tolerance of the carriers 96 in contact with the BPPs 17 is reduced and a yielding of the toothed belts 46a, 46b is limited in combination with the guide rails 124.

Advantages and functions of the bearing arrangement of the toothed-belt system and of the structure of the housing or frame structure 84 are explained below.

The above-described toothed-belt shafts—drive shaft 100 and return shaft 102—are located, rotatably mounted, between the first and the second bearing shields 88a, 88b, which in turn are fixed to the base plate 74 in a displaceably mounted manner In order to increase the rigidity of the vertical de-stacker 24 and prevent a deformation of the bearing shields 88a, 88b due to the weight of the BPPs 17 and the tension force of the toothed belts 46a, 46b, the end plate 90, which establishes a connection between all bearing shields 88a, 88b and ensures a constant distance between the pairs of toothed belts 46a, 46b, is located on the top of the bearing shields 88a, 88b.

In addition, the reinforcing means 92, which keep the bearing shields 88a, 88b at a defined distance from each other, stiffen them and prevent a bulging of the bearing shields 88a, 88b during loading and unloading as well as during transport, are located between the bearing shields 88a, 88b.

As required, the struts of the reinforcing means 92 may be detached and removed without disassembling the bearing shields 88a, 88b in order to be able to adapt the BPP feed system to the respective requirements.

These reinforcing means 92 are advantageous for compensating a unilaterally open design of the vertical de-stacker 24 and the losses of mechanical rigidity connected therewith.

This unilaterally open design of the vertical de-stacker 24 makes it possible to simplify the loading of the vertical de-stacker 24, e.g., in a parallel-sequential sequence, and to realize various scenarios of an NOK strategy described in more detail below.

The structure of preferred embodiments of the delivery device 26 is described below in more detail with reference to the illustration of FIGS. 8 to 14.

Figure 8:
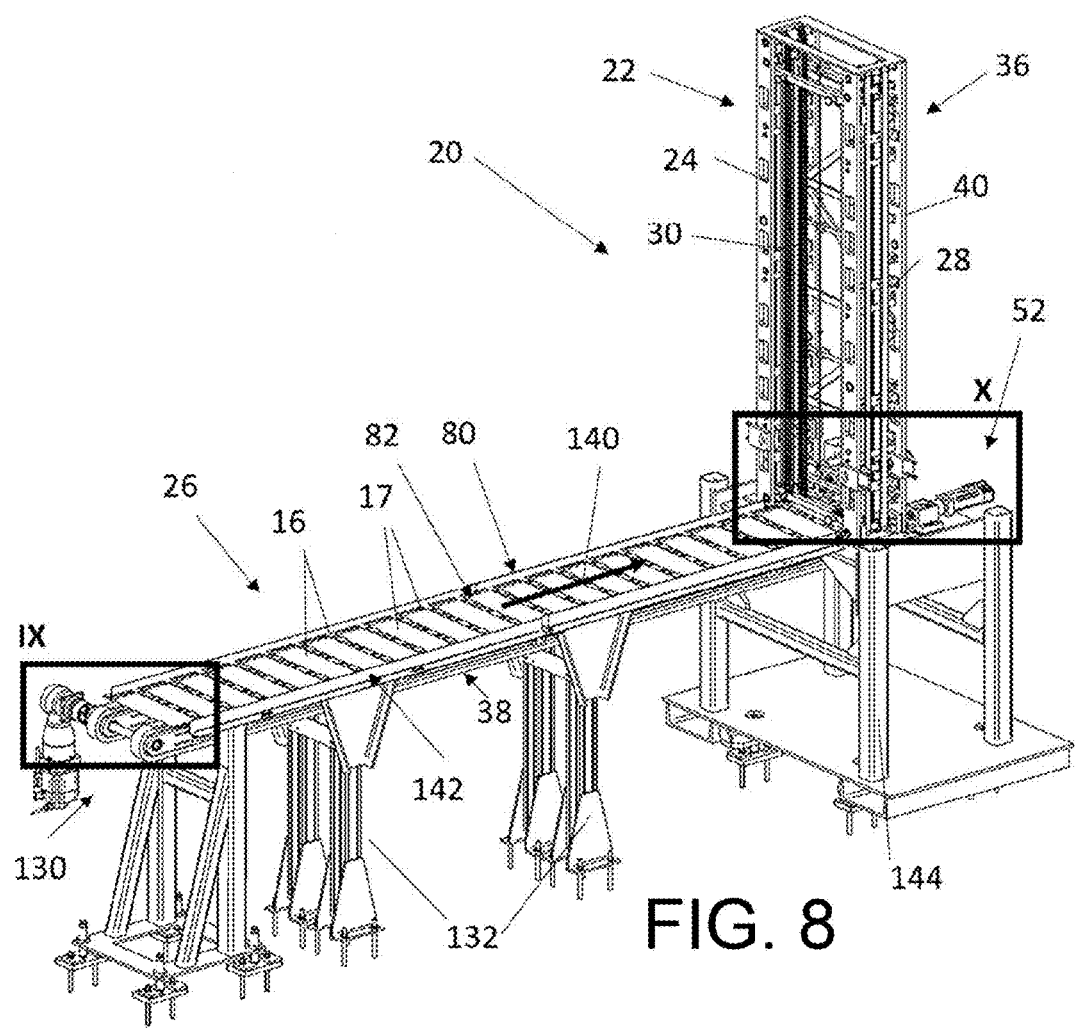
FIG. 8 shows a perspective view of a specific exemplary embodiment of the cell component de-stacking device with a delivery device and a vertical de-stacker at an accommodating unit of the delivery device.
Figure 9:
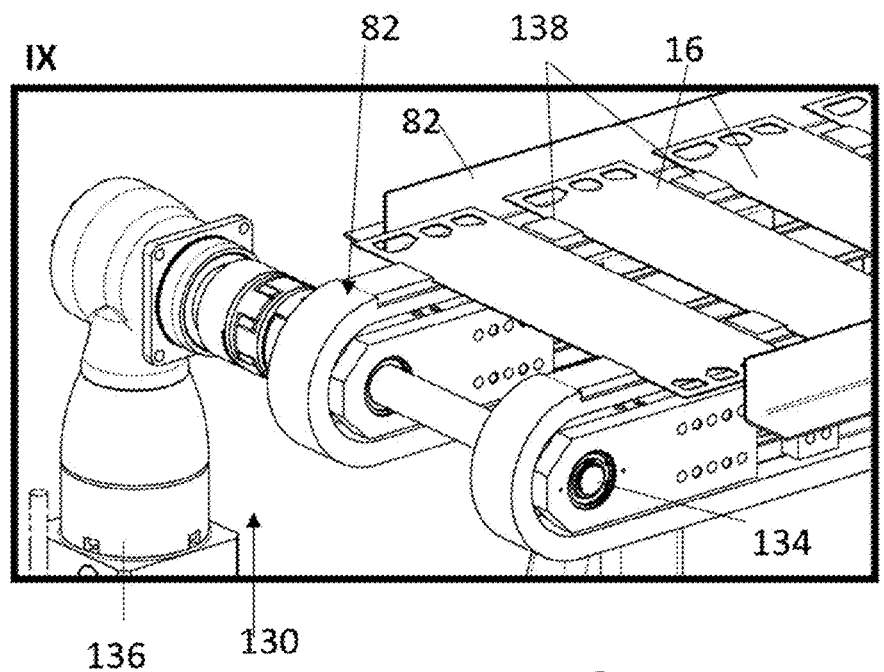
FIG. 9 shows a detailed view of the detail IX of FIG. 8.
Figure 10:
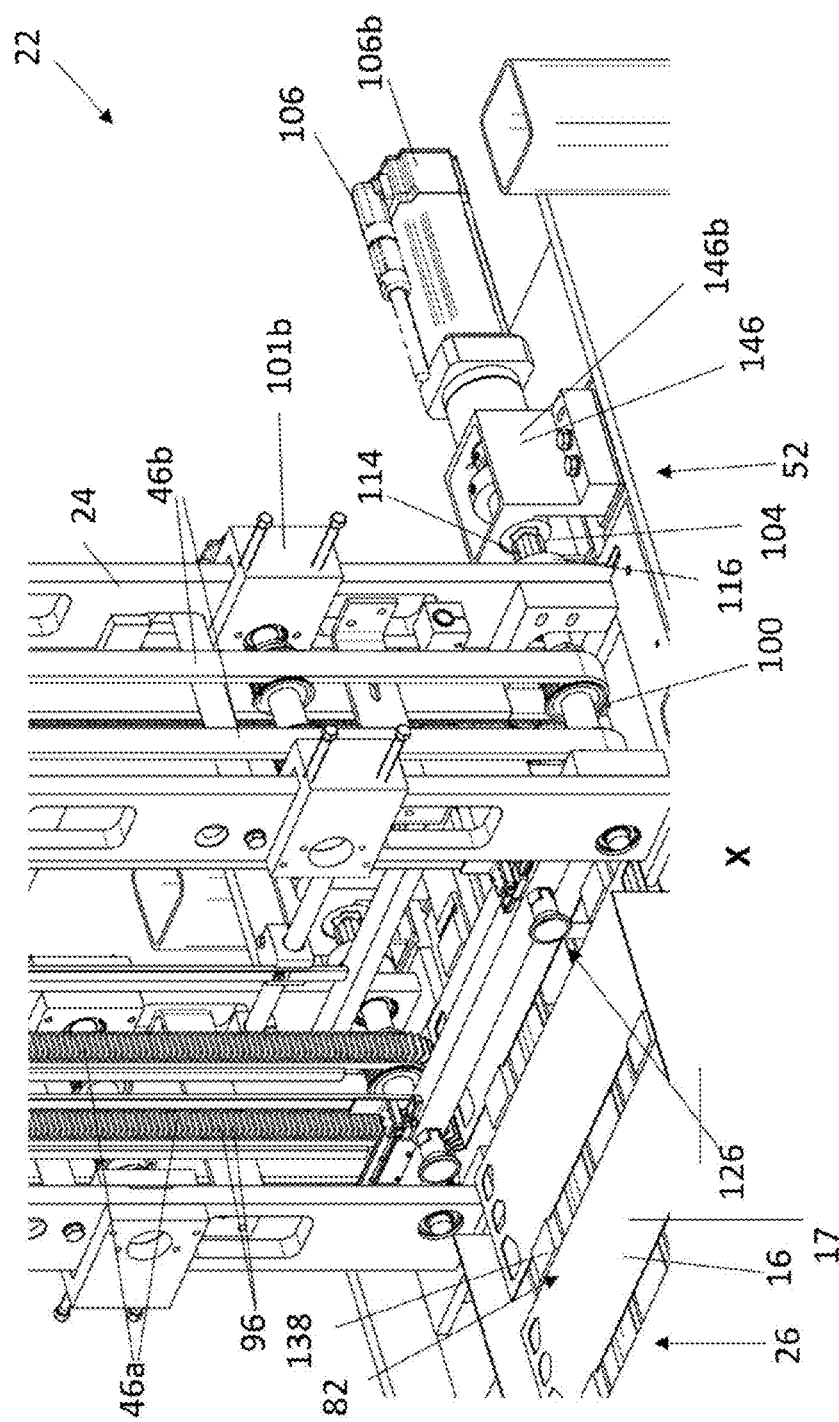
FIG. 10 shows a detailed view of the detail X of FIG. 8.
Figure 11:
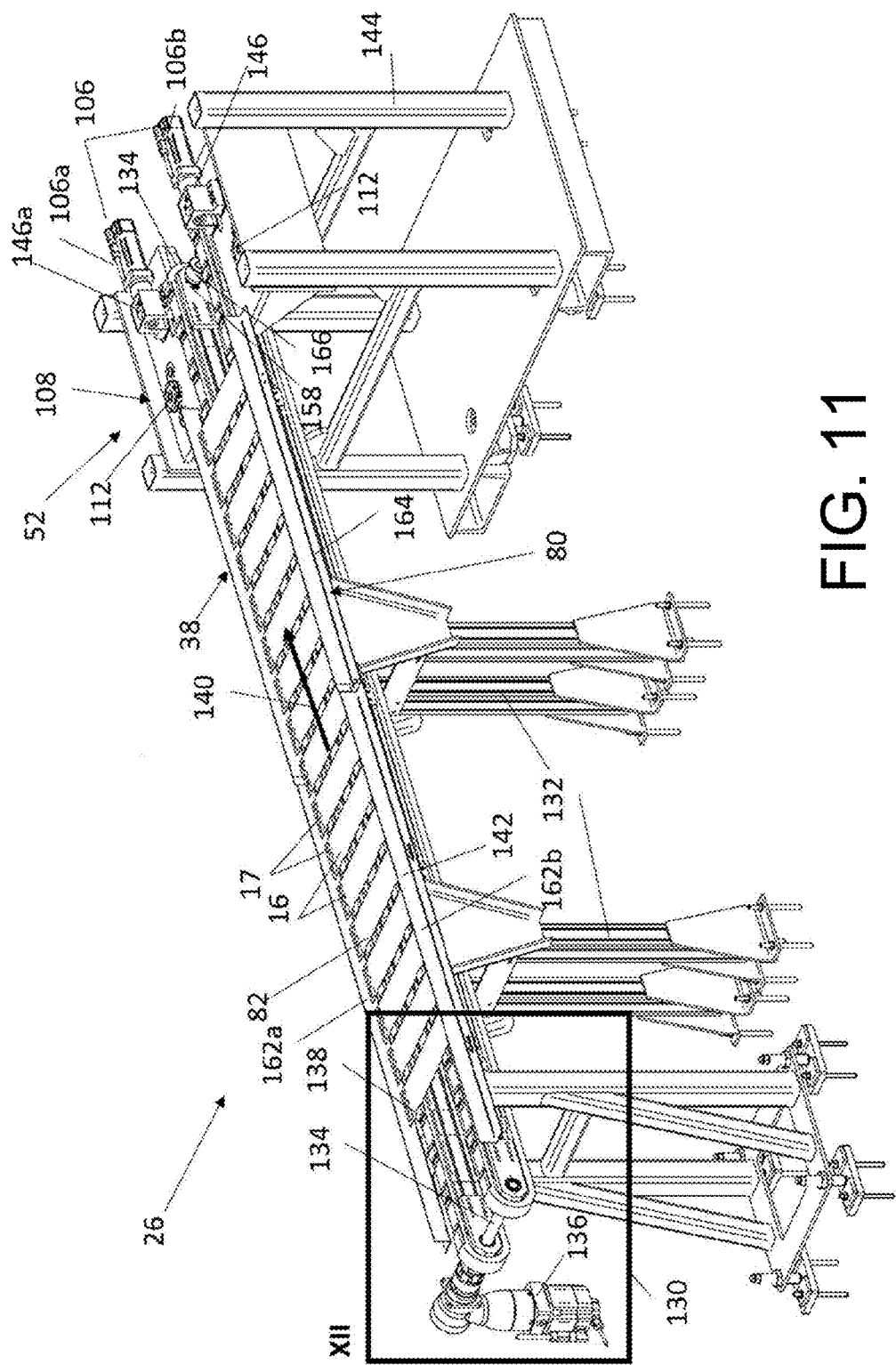
FIG. 11 shows a perspective view of the delivery unit of the cell component de-stacking device of FIG. 8 without the vertical de-stacker.
Figure 12:
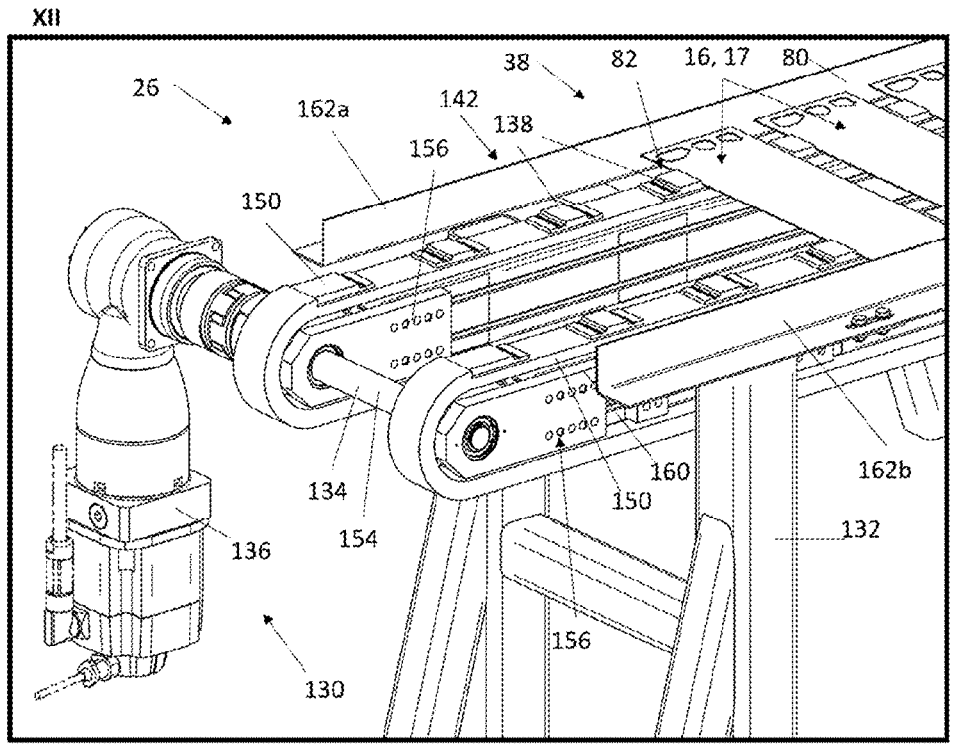
FIG. 12 shows a detailed view of the detail XII of FIG. 11.
Figure 13:
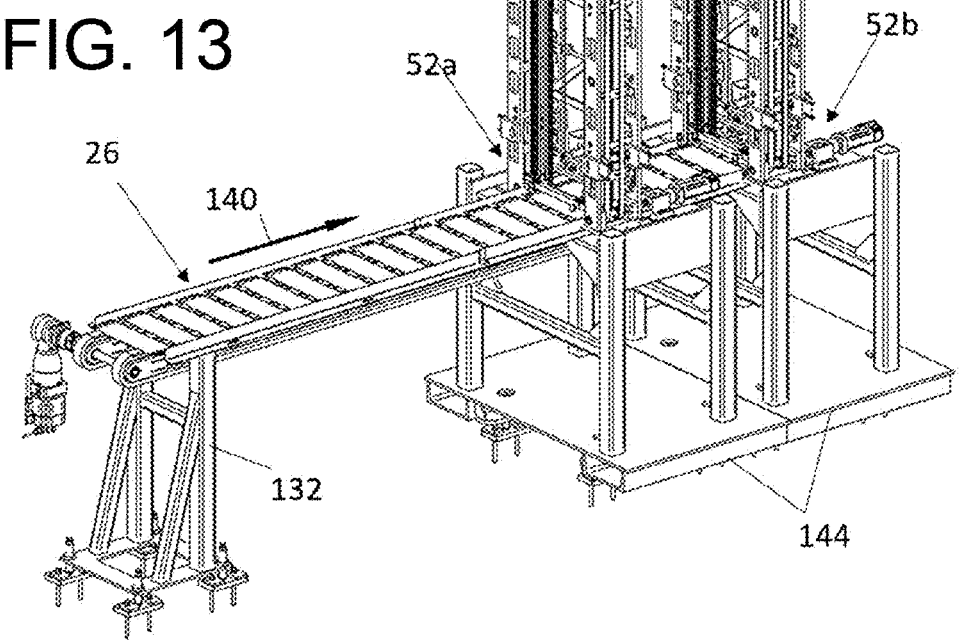
FIG. 13 shows a modification of the cell component de-stacking device of FIG. 8 with two accommodating units and two vertical de-stackers.
Figure 14:
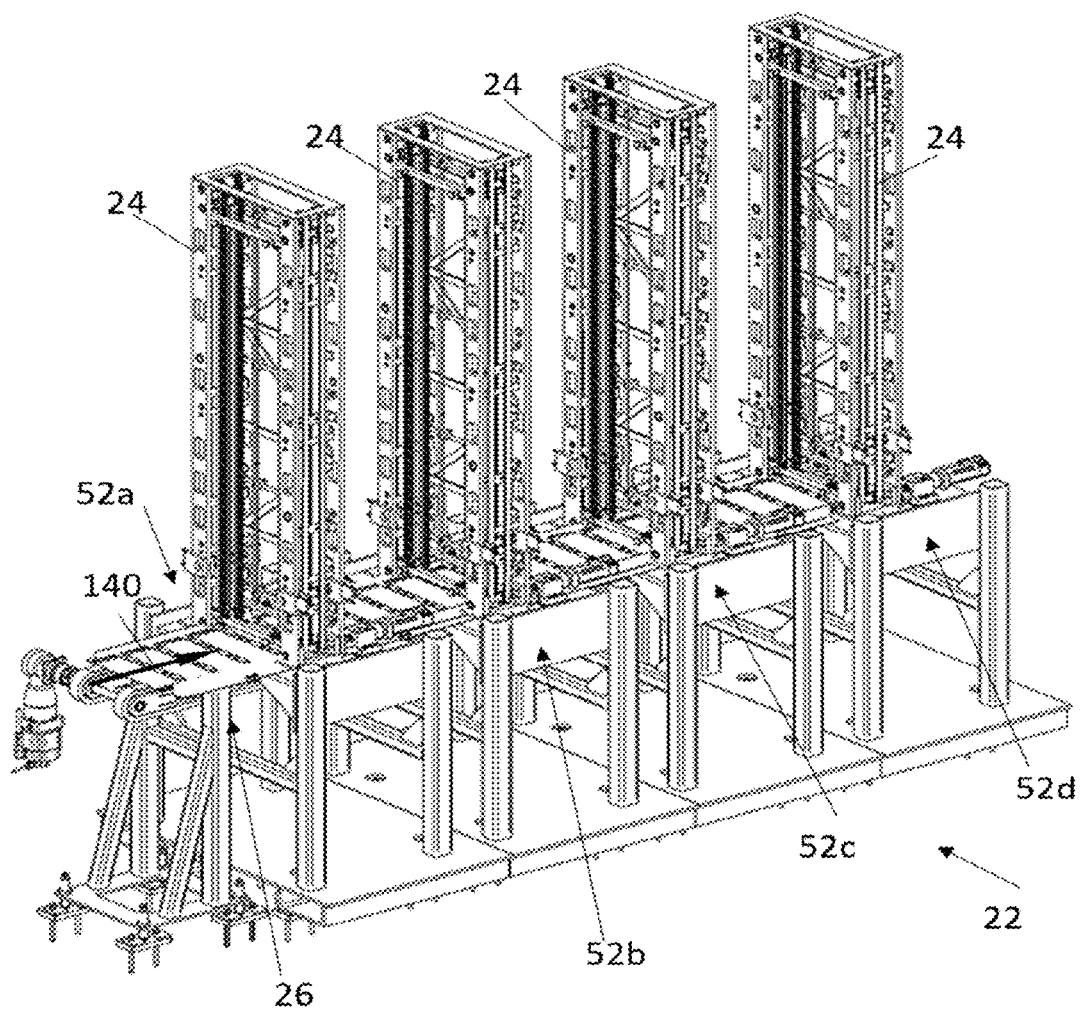
FIG. 14 shows another modification of the cell component de-stacking device of FIG. 8 with four accommodating units and four vertical de-stackers.

FIG. 8 shows an exemplary embodiment of the cell component de-stacking device 22, which includes the vertical de-stacker 24 in combination with the delivery device 26 at the filling station 20. FIG. 9 shows the detail IX of FIG. 8. FIG. 10 shows the detail X of FIG. 8. FIG. 11 shows the delivery device 26 without the vertical de-stacker 24. FIG. 12 shows the detail XII of FIG. 11. And FIGS. 13 and 14 show modifications of the cell component de-stacking device 22 with several accommodating units 52a-52d at the delivery device 26, for the purpose of accommodating and filling several vertical de-stackers 24.

In the configurations shown in FIGS. 8 to 12, the delivery device 26 has the accommodating unit 52 for accommodating, in a positioned manner, the vertical de-stacker 24. In the modifications of FIGS. 13 and 14, the delivery device 26 also includes one or more further accommodating units 52a-52d for accommodating, in a positioned manner, one further vertical de-stacker 24 each.

According to FIGS. 8 to 12, the delivery device 26 has a positive feed conveying means, which is configured as a feed chain or feed conveyor, for laterally delivering the first cell components 16 to the at least one vertical de-stacker 24. In the configuration shown, the delivery device has a filling conveyor 82 as a feed conveying means.

Moreover, the delivery device 26 has a drive system 130 for the delivery movement.

In the specific configuration, a machine rack 132, which carries one filling conveyor shaft 134 at each of the two longitudinal ends thereof in order to support the filling conveyor 82 configured as a pair of toothed belts, is provided at the filling station for the purpose of forming the delivery device 26. One of the filling conveyor shafts 134 serves as a drive shaft and is driven by an actuator 136, in particular a servo motor, of the drive system 130. The filling conveyor 82 is provided on the outer side thereof with positive gripping members 138 adapted to the contour of the first cell components 16, in order to positively grip the first cell components 16 and deliver them in a positioned manner in the delivery direction 140 when the filling conveyor 82 moves, controlled by the control unit 78 and the drive system 130. Thus, a row of positive gripping members 138 is provided that are configured for positively gripping the first cell components 16 and are movable for delivering the first cell components 16 towards the vertical de-stacker 24.

Moreover, the delivery device 26 has a guiding system 142, which is funnel-shaped in at least some areas, for positioning the first cell components 16 in the direction transverse to the delivery direction 140 during delivery. Thus, the first cell components 16 can be pre-positioned already during delivery.

The function of the BPP feed conveyor is explained below with reference to the illustration in FIGS. 11 and 12. FIGS. 11 and 12 show the BPP feed conveyor 38 for loading the vertical de-stacker 24, including detailed views. In particular, FIG. 11 shows the overall perspective view of the BPP feed conveyor 38, and FIG. 12 shows the detailed view XII of the BPP feed conveyor 38.

The BPP feed conveyor 38 includes a toothed-belt system composed of two modified toothed belts 150 (example of filling conveyor 82) with a peripheral negative contour for prepositioning the BPPs 17, the drive system 130 including the drive shaft 154, the tensioning system 156 and position sensors 166, a return shaft 158 and a sliding guide system 160 for supporting the loaded toothed belts 150/the loaded BPP feed conveyor 82.

The negative contour on the toothed belts 150 for prepositioning the BPPs 17 is produced mainly by milling it into the material of the toothed belts or by screwing on positioning members—examples of the gripping members 138 of the filling conveyor 82—and is specially adapted to the BPPs 17 to be processed, or the defined contact areas thereof.

In addition, in order to position of the BPPs 17 crosswise to the transport direction, guide bars 162a, 162b are mounted for obtaining the correct position for the insertion of the BPPs 17 between the carriers 96 of the vertical de-stacker 24 within the tolerances.

In the front area, these guide bars 162a, 162b converge in a funnel shape in the direction of the handover position, thus forming the funnel-shaped guide system 142, and then transition into a parallel guiding region for forming a parallel guide system 164. Depending on the component geometry and the positioning requirements, these guide bars 162a, 162b can be appropriately adjusted.

The accommodating units 52, 52a-52d of the embodiments shown in FIGS. 8 to 14 of the delivery device 26 each have at least one actuator 106 for driving the lifting and lowering movement of the first cell components 16 in the vertical magazine 28 and at least one preferably switchable coupling device for coupling 146, 146a, 146b the at least one actuator 106 with the lifting and lowering device 30 of the at least one vertical de-stacker 24.

For forming the accommodating unit(s) 52, 52a-52d, one separate frame 144 is provided in each case, which can be arranged in a firmly positioned manner relative to the machine rack 132 by means of positioning units that are not shown here, and on whose top the zero-point clamping system with the positioning opening 112 for accommodating the associated vertical de-stacker 24 in a positioned manner and the first and second drive units 106a, 106b as actuators 106 are arranged. Each drive unit 106a, 106b can be coupled with a switchable coupling device 146a, 146b to the coupling end of the respective drive shaft 100 on the first and the second side 94a, 94b of the vertical de-stacker 24. It is configured such that the braking system 114 of the drive shaft 100 is also urged into its release position during coupling.

By positioning several such frames 144 next to one another, the delivery device according to FIGS. 13 and 14 is configured for accommodating a first vertical de-stacker 24 at a first accommodating unit 52a and a second vertical de-stacker 24 at a second accommodating unit 52b and for filling them consecutively. Thus, the delivery device 26 is configured for filling in parallel several vertical de-stackers 24 at accommodating units 52a-52b disposed consecutively in the delivery direction 140.

In the exemplary embodiments of the delivery device 26 shown, a filling of the respective vertical de-stacker 24 from below is provided. The first cell components are delivered by a lateral delivery 140. In other embodiments not shown in more detail, the delivery device 26 is configured for filling the at least one vertical de-stacker from above.

The function of the delivery device 26 and the filling of the vertical de-stackers 24 are described below in more detail with reference to the illustration in FIGS. 8 to 12.

The initial situation for loading the belt de-stacker 40 or, more generally, the vertical de-stacker 24, is that the first cell components 16, which are configured as BPPs 17, are inserted into the filling station 20 on the feed conveying means adapted to their contour—the filling conveyor 82.

Future applications, with a growing demand for PEMFC stacks, result in a strong increase of repeating components to be processed (BPPs 17 and MEAs 19).

Therefore, a direct interlinking of the BPP manufacture and stacking is considered very advantageous with regard to the logistical effort of the material feed. In this case, there is also an option of a combination with the feed of rolled goods in accordance with source [6].

A direct interlink is in this case to be understood to be the direct deposition of the checked OK-BPP 17 (OK=okay, in order, NOK=not okay, not in order) into the negative contour of the feed conveying means—the filling conveyor 82—without any intermediate step. The BPPs 17 are pre-positioned on the filling conveyor 82 formed by modified toothed belts.

The BPPs 17 pre-aligned on the BPP feed conveyor 38 are transported in the direction of the vertical de-stacker 24. This transport process may run both in cycles and in a continuous manner.

The operation in cycles of the BPP feed conveyor 38 includes the advantages of a more simple and precise positioning for the subsequent lifting process and of an avoidance of relative movements between the BPPs 17 and the gripping members 96 of the toothed belts 46a, 46b of the vertical de-stacker 24. Thus, process reliability can be enhanced and the risk of damage to the BPPs 17 reduced. Only the permanent acceleration and deceleration processes provide for an increased stress on the BPP feed conveyor 38.

A continuous material feed/a continuous material flow of the BPPs 17 from BPP fabrication to the BPP feed conveyor 38 can be realized in both process characteristics.

The alignment of the BPP 17 perpendicular to the transport direction has already taken place due to the funnel-shaped guide system 142 of the BPP feed conveyor 38. This position is maintained by the, for example, four toothed belts 46a, 46b of the opposing pairs of toothed belts of the vertical de-stacker 24 during the accommodating process and may only be altered within the confines of the compliance of the toothed belts 46a, 46b due to the mechanical limitation during the entire loading process.

The BPPs 17 are aligned in the transport direction—the delivery direction 140—by the controlled drive system 130 of the BPP feed conveyor 38 (rough pre-positioning) on the one hand, and by the further guide system 120 within the vertical de-stacker 24.

In a preferred embodiment, this guide system 120 of the vertical de-stacker 24 in turn has a funnel shape in the vertical direction, whereby, during upward transport (lifting movement), the BPPs 17 are mechanically aligned in accordance with the positional specifications at the areas provided therefor (alignments).

Both the lifting movement during the filling of the vertical de-stacker 24 and the subsequent lowering movement during de-stacking are carried out by drive units 106a, 106b, which can be coupled to the vertical de-stacker 24 by means of the switchable coupling devices 146, 146a, 146b. In preferred embodiments, an alignment of the component on the front side in the transport direction is provided.

The functions of the closure system 126, the formation of a peripheral guide system, a buffering and an advantageous NOK strategy are described in more detail below with reference to the illustration in FIGS. 7 to 12.

In order to guide the BPPs 17 peripherally (at the first to fourth sides 94a-94d), the closure system 126 is provided on the front side (fourth side 94d), which generates the BPP guidance on the inner side (rear side in the transport direction) of the vertical de-stacker 24.

This closure system 126 is closed both during the loading process and during the transport of the fully loaded vertical de-stacker 24 to the respective buffering site (not shown, at the buffer station) and thence to the stacking station 12.

The closure system 126 is preferably opened exclusively when an NOK case occurs, for the implementation of the NOK strategy.

As will be explained in more detail below, an NOK case conceptually means a non-filled carrier level in the vertical de-stacker 24, because defective BPPs 17 are immediately removed during the loading process. The position of the empty carrier level is detected and stored.

Preferably, the NOK strategy provides that a prepared OK-BPP 17 is lifted up to and inserted into an empty NOK carrier level by means of a lifting system, whereby the present BPP gap is filled.

In principle, the goal is a very small number of NOK BPPs within the handling process (stacking); therefore, a 100% OK incoming goods inspection of the repeating components is to be carried out. This takes place already on the BPP manufacturing side, prior to the deposition on the delivery device 26.

The probability of an NOK BPP ending up in the stacking process despite a 100% OK inspection increases in accordance with the generated output quantity.

An automated removal of the closure system 126 is not necessarily required in an experimental or small scale system (NOK strategy version 1.0). In the case of small series, the closure system 126 can thus be manually opened and the empty space can be filled.

The devices and methods described herein are to be configured particularly for large scale production, so that a very large quantity of cell components 16, 18 are to be processed.

As the output quantity and the degree of automation of the overall system increase, an automated removal of the closure system is desirable.

An automated removal of the closure system 126 is implemented in the following manner in embodiments of the manufacturing device 10.

In one embodiment, a device for automatically filling an empty space in the vertical de-stacker 24 is provided, for example at the buffer station (which is not shown). An embodiment of the device for automatic filling automatically opens the closure system 126 in accordance with the principle of a controller cylinder in constant-mesh transmissions.

A mechanical system with a defined contour ("controller cylinder") engages with one or several actuating elements ("shift forks") and, by a translational and/or rotational movement, generates the opening movement of the closure system 126. The controller cylinder is located within the buffer station as a stationary element. Thus, the positioning of the actuating mechanism ("controller cylinder") relative to the actuating elements ("shift forks") of the vertical de-stacker 24 can already be realized through placement and fixing by means of the zero-point clamping systems. The actuating mechanism ("controller cylinder") and the actuating element ("shift fork") are coupled already by placing the vertical de-stacker on the buffer station, or by a separate coupling process.

The separate coupling process constitutes an active movement of the actuating mechanism ("controller cylinder") towards the actuating member ("shift fork").

In order to fill the empty space, one embodiment of the device for filling operates in accordance with the principle of a pneumatic cylinder.

For example, stationary pneumatic cylinders are provided on the buffer station, which are docked to the guide system in an NOK case and then first lift the alignments from the BPPs in the horizontal plane and then move them to the side.

In order to implement the NOK strategy, an incoming goods inspection is carried out at the delivery device 26. For example, optical systems may be provided for checking the BPPs 17 on the BPP feed conveyor 38. The NOK BPP is already detected on the BPP feed conveyor 38 and removed.

This process may be carried out, for example, by blowing out with a pressurized-air pulse or ejection by means of a mechanical ejection mechanism.

The removed NOK BPP are caught in corresponding NOK BPP containers, collected and removed from the system (damage analysis, recycling, etc.).

Thus, a vacancy is created on the BPP feed conveyor 38, and thus also a vacancy within the belt de-stacker 40, which is then filled by the lifting mechanism (NOK strategy version 1.0), e.g., at the buffer station.

An alternative NOK strategy is also provided and is described below as version 2.0.

In the alternative NOK strategy 2.0, a vacancy is avoided by means of an adapted management of the BPP conveyor feed.

One advantage of this constellation of a BPP conveyor feed in combination with the belt de-stacker 40 is that it is possible to realize an NOK strategy by means of the two systems themselves. A separate lifting mechanism is not required.

In this case, vacancies in the belt de-stackers 40 are directly avoided by an appropriate management of the BPP conveyor feed. This means that, in a detected NOK case, the vacancy produced (ejection of the NOK BPP) on the BPP feed conveyor 38 is compensated by moving the latter on in the cycle. The lifting and lowering device 30 of the belt de-stacker 40 is not moved during this time (no lifting movement). Thus, a vacancy can be avoided directly in the BPP filling station 20.

In the case of a parallel-sequential filling of the vertical de-stackers 24 with several accommodating units 52a-52d at the delivery device, the effort with respect to the management of the BPP feed conveyor in combination with the lifting movements of the individual vertical de-stackers is slightly more complex but can also be handled.

Particularly against the background of increasing output quantities, this variant 2.0 of the NOK strategy is preferred because the lifting mechanism including the handover process at the buffering site can be dispensed with.

The above-described NOK strategy of version 1.0 is suitable mainly for a small output quantity.

With this approach, a correction of the NIO vacancies within the belt de-stackers 40 can also be realized manually by a worker.

The above-described NOK strategy of version 2.0 is suitable for larger output quantities and the use within the large scale fabrication of PEMFC stacks (increasing degree of automation). The use of this NOK strategy 2.0 is accompanied by an increasing effort with regard to the management of the BPP feed system/BPP feed conveyor (software of the control unit 78), while the mechanical system constellation (omission of the lifting unit) is reduced.

A possible implementation of a sequential or parallel-sequential filling of the vertical de-stackers 24 is explained below with reference to the illustration of FIGS. 13 and 14.

In order to permit a continuous material feed/a continuous material flow of the BPPs 17, it is advantageous if an empty vertical de-stacker 24 ready for loading is always available within the filling station 20 (loading station) at the end of a loading process of a vertical de-stacker 24.

FIG. 13 provides an embodiment of the smallest unit of the preferred filling station for sequentially filling the vertical de-stackers 24, which has at least two loading positions for vertical de-stackers 24. For this purpose, the first and the second accommodating unit 52a, 52b are provided one behind the other in the delivery direction 140 at the delivery device 26.

This construction is schematically depicted in FIG. 13 with two empty vertical de-stackers.

In particular, FIG. 13 shows the set-up of a BPP loading station—filling station 20—for a sequential loading process.

In this case, the loading process of the vertical de-stackers 24 is carried out sequentially.

Depending on the cycle time requirements or the requirements with regard to the PEMFC stack output, a parallelization of the loading process can be carried out, see FIG. 14.

For the parallel loading of two vertical de-stackers 24, for example, two empty vertical de-stackers 24 ready for loading may also be kept available in the filling station 20 at the end of the loading process.

An exemplary design is schematically shown in FIG. 14 with four empty vertical de-stackers 24. In particular, FIG. 14 shows the set-up of the BPP loading station—filling station 20—for a parallel-sequential loading process. The first to fourth accommodating units 52a-52d are provided one behind the other in the delivery direction 140 at the delivery device 26.

In this case, the loading process of the vertical de-stackers 24 is carried out parallel-sequentially.

The capability of easily expanding the entire BPP feed conveyor 38 in a modular manner enables, in parallel with the variable number of BPPs 17 in the vertical de-stacker 24, an adjustment to all requirements with regard to the PEMFC stack cell number and the PEMFC stack output quantity.

The emptying of the vertical de-stacker 24 and the insertion of the BPPs 17 into the stack are explained below with reference to the illustration in FIGS. 5 and 6.

FIG. 5 shows a perspective view of the stacking station 12 with several stacking devices 32. The initial situation for emptying the vertical de-stacker 24 is that the fully loaded vertical de-stacker 24 is positioned and fixed above the stacking device 32 in the stacking station 12 by means of zero-point clamping systems, as is shown in FIG. 5. The accommodating unit 50 of the stacking station 12 is configured analogously with the above-described accommodating units 52, 52a-52d of the filling station 20. In particular, FIG. 5 shows the initial situation for emptying the vertical de-stacker 24.

The vertical de-stacker 24 is positioned in a plumb manner by the accommodating units 50, 52, 52a-52d, so that a lifting and lowering movement of the first cell components 16 in the vertical de-stacker 24 takes place in a vertical manner, parallel to gravity.

The initial situation shown in FIG. 5 also entails that NOK gaps that were possibly created are filled, and that all BPPs 17 located within the vertical de-stacker 24 are positioned within the confines of the admissible tolerance field.

The emptying of the vertical de-stacker 24 merely requires the release of the blocking or braking system 114 and the reversal of the driving direction of the two pairs of toothed belts 46a, 46b in the opposite direction to the direction of rotation used during the loading process.

Thus, the BPPs 17 are transported downwards, in the direction of the stacking device 32, where they are then fashioned, alternately with the MEA components, into a PEMFC stack.

In analogy with the loading process, this process takes place in cycles or continuously, depending on the case of application. Due to the structural conditions of the vertical de-stacker 24, the deposition of the BPPs 17 on the growing PEMFC stack can be carried out at very small distances, which increases component protection, the process reliability of the stacking process connected therewith, and the cycle time potential of the overall process. In addition, the defined time for manufacturing an individual cell (BPP+MEA), which follows from the requirements of the respective customer, can be adapted to the deposition process of the individual component due to this structure of the vertical de-stacker 24. That means that, if 70% of the cycle time of the deposition of an individual cell (BPP+MEA=100%) is required for the deposition of the MEA 19, for example, the vertical de-stacker 24 may be continuously adapted to this situation with the software implemented in the control system 76. In addition, it is additionally possible to create a "learning" process by means of further process monitoring systems, which is capable of reacting to corresponding tendencies during the stacking process.

In addition, the above-described continuously adjustable system speed for implementing scalability with regard to the output quantity is provided by these properties.

It is the function of the BPP feed conveyor 38 to accommodate the BPPs 17 directly out of the manufacturing and checking process and feed them to the vertical de-stacker 24, without any intermediate step or further handling operation.

A process of storing the BPPs 17 in magazines together with the associated removal process would in this case have to be considered to be an intermediate step.

As is described below, an operation is also possible with an intermediate step, due to the variability of the cell component de-stacking device 22 with a BPP feed conveyor 38 and a vertical de-stacker 24, but significant advantages, such as cycle time potential and component protection, for example, are cancelled thereby.

A continuous material flow is advantageous for the operation of the delivery device 26 in combination with the vertical de-stacker 24. The background for this is that the manufacturing and checking process of the BPPs 17 is a sluggish process that should be carried out with a constant process speed. Constant stopping and restarting is disadvantageous and should be avoided.

Variability of the cell component de-stacking device 22:

However, the cell component de-stacking device 22 may also be used as an "intermediate solution" with regard to the PEMFC stack output.

In this case, the operation of the vertical de-stacker in a BPP material feed from conventional storage magazines is considered to be the "intermediate solution".

This system flexibility is attractive due to the fact that currently, the BPPs 17 are frequently provided in conventional storage magazines together with intermediate plies for the production of very small numbers.

The loading of the BPP feed conveyor 38 can be carried out using a robot, for example, in combination with a multiple gripper, which corresponds to the current prior art with regard to the feed of BPPs 17.

Thus, a ramp-up with respect to the numbers of PEMFC stacks and the accompanying switch of the BPP material feed from a storage magazine towards a direct interlink can be carried out without changing the system core—cell component de-stacking device 22.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Manufacturing device
12 Stacking station
14 Fuel cell layer structure
16 First cell component
17 BPP
18 Second cell component
19 MEA
20 Filling station
22 Cell component de-stacking device
24 Vertical de-stacker
26 Delivery device
28 Vertical magazine
30 Lifting and lowering device
32 Stacking device
34 Lateral feed system
36 BPP feed system (example of cell component de-stacking device)
38 BPP feed conveyor (example of delivery device)
40 Belt de-stacker (example of vertical de-stacker)
42 Guide system (stacking station)
44 Vibrating device
46 Toothed belt
46a First toothed belt
46b Second toothed belt
48 Conveying means
48a First conveying means
48b Second conveying means
50 Accommodating unit (stacking station)
52, 52a-52d Accommodating unit (filling station)
54 Depositing station
56 Removal station
58 Pressing station
60 Pressing machine
60a First pressing machine
60b Second pressing machine
62a Transporting system first pressing machine
62b Transporting system second pressing machine
64 Stacking device transporting system
66 Friction feeder
68 Storage magazine
70 Lifting actuator
72 Push rod
74 Base plate (stacking device)

76 Control system
78 Control unit
79 Coupling device
80 Guide system (delivery device)
82 Filling conveyor
84 Self-supporting housing or frame structure
86 Base plate (vertical de-stacker)
88a First bearing shield
88b Second bearing shield
90 End plate
92 Reinforcing means
92a Transverse reinforcing means
92b Diagonal reinforcing means
94a First vertically extending side
94b Second vertically extending side
94c Third vertically extending side
94d Fourth vertically extending side
96 Gripping member (carrier)
98 Transmission
100 Drive shaft
101a First tensioning unit
101b Second tensioning unit
102 Return shaft
103a First tensioning shaft
103b Second tensioning shaft
104 Coupling end (example of coupling part on the side of the vertical de-stacker)
106 Actuator (accommodating unit)
106a First drive unit (e.g., servo drive unit, example of actuator 106)
106b Second drive unit (e.g., servo drive unit, example of actuator 106)
108 Positioning device
110 Register pin
112 Positioning opening
114 Braking system
116 Friction brake
118 Abutting and/or guiding device
120c Rear guide system (vertical de-stacker)
120d Front guide system (vertical de-stacker)
122c Rear guide rod
122d Front guide rod
124 (Lateral) guide rails
126 Closure system
128 Crossbar
129 Disengageable engaging member
130 Drive system for delivery movement
132 Machine rack
134 Filling conveyor shaft
136 Actuator of drive system for delivery movement
138 Positive gripping members (carriers) of filling conveyor
140 Delivery direction
142 Funnel-shaped guide system (delivery device)
144 Rack (accommodating unit)
146, 146a, 146b (Switchable) coupling device
150 Modified toothed belt
154 Drive shaft (filling conveyor)
156 Tensioning system (filling conveyor)
158 Return shaft (filling conveyor)
160 Sliding guide system
162a, 162b Guide bars
164 Parallel guide system
166 Position sensor
H Main process (the steps of the main process are depicted in boxes with a solid border);
N/P Secondary process/parallel process (steps of a secondary process/parallel process taking place in parallel during the main process are depicted in boxes with a dotted border);
S01 Insert lower end component into stacking device;
S02 Fix lower end component in stacking device;
S03 Position guide system for repeating components;
S04 Transport stacking device to stacking position;
S05 Lower end component in starting position;
S06 START STACKING PROCESS;
S07 Lateral insertion of MEA by feeder;
S08 Vertical insertion of BPP by BPP feed system;
S09 Alignment of MEA and BPP with guide system;
S10 STOP STACKING PROCESS;
S11 SUBSEQUENT PROCESSES;
S12 Loop of stacking devices;
P01 Parallel process: Insertion of filled vertical de-stacker of BPP feed system into stacking station;
P02 Parallel process: Insertion of MEAs into a storage magazine of a feeder;
P03 Parallel process: If necessary, support of alignment process by means of vibration;
P04 Parallel process: Adjustment of level of stacking device for constant depositing position;
N01 Vertical de-stacker aligned and fixed above stacking position and ready for separation;
N02 MEA storage magazine filled in defined manner, MEAs positioned and ready for separation;
N03 Alternating insertion of BPP and MEA up to reaching the required cell number;
N04 Variation of cycle time between MEA insertion and BPP insertion possible;
N05 Transport of stacking device from stacking station, transport of stacking device to subsequent processes.

The invention claimed is:

1. A manufacturing device configured to manufacture a fuel cell layer structure with alternately arranged first cell components and second cell components, each first cell component being plate component and each second cell component being a membrane component, comprising:
at least one stacking station with at least one stacking device configured to stack the first and the second cell component on top of one another in an alternating manner;
at least one vertical de-stacker, which is configured to be moved between at least one filling station and the at least one stacking station, to accommodate a plurality of first cell components in a vertical arrangement with a lifting and lowering device for lifting and lowering the first cell components and for de-stacking separated first cell components in a vertical direction to the at least one stacking device; and
a lateral feed system configured to laterally feed separated second cell components to the at least one stacking device.

2. The manufacturing device according to claim 1, further comprising a cell component de-stacking device for vertically de-stacking separated first cell components at the at least one stacking station during manufacturing of a fuel cell layer structure and for providing the at least one vertical de-stacker filled with first cell components, comprising:
the at least one vertical de-stacker with a vertical magazine for accommodating a plurality of the first cell components in a vertical arrangement and with a lifting and lowering device for lifting and lowering the first cell components in the vertical magazine and for de-stacking separated first cell components in the vertical direction; and a delivery device configured to deliver the separated first cell components at the at least one filling station to the at least one vertical de-stacker, wherein the at least one vertical de-stacker is configured to fill the vertical magazine at the at least one filling station by individually accommodating the cell components and moving them by means of the lifting and lowering device, and wherein the at least one vertical de-stacker is further configured to be moved between the at least one filling station and the at least one stacking station and to individually dispense the first cell components in a vertical direction at the at least one stacking station by means of a downward movement.

3. The manufacturing device according to claim 2, wherein the vertical de-stacker comprises at least one or several of the following elements:
   3.1 a self-supporting housing or frame structure;
   3.2 at least one first conveying means movable in the vertical direction at a first side of the vertical magazine and at least one second conveying means synchronously movable in the vertical direction at a second side opposite the first side, wherein the conveying means each have a row of gripping members for gripping and supporting the cell components;
   3.3 at least one first toothed belt movable in the vertical direction at a first side of the vertical magazine and at least one second toothed belt synchronously movable in the vertical direction at a second side opposite the first side;
   3.4 an actuator configured to drive the lifting and lowering movement or a coupling part for coupling an actuator for driving the lifting and lowering movement to the vertical de-stacker,
   3.5 a positioning device configured to position the vertical magazine at least one of at the filling station or at the stacking station;
   3.6 a blocking or braking system configured to block or brake at least the downward movement of the cell components in the vertical magazine;
   3.7 at least one abutting device or guiding device configured to abut or guide the cell components during at least one of filling or lifting and lowering;
   3.8 a vertical guiding device, which is funnel-shaped in at least some areas, configured to position the cell components during delivery or filling;
   3.9 a closure system configured to disengageably fixing the at least one abutting device or guiding device; and
   3.10 the vertical magazine being configured to be substantially cuboid, the lifting and lowering device being disposed at a first and an opposite second vertically extending side of the vertical magazine, the at least one abutting device or guiding device, against which the cell components accommodated in the vertical magazine abut, being removably disposed at at least one of a third or fourth vertically extending side extending transversely to the first and second side.

4. The manufacturing device according to claim 2, wherein the delivery device comprises at least one or several of the following elements:
   4.1 at least one accommodating unit configured to accommodate, in a positioned manner, the vertical de-stacker;
   4.2 one or more further accommodating units configured to accommodate, in a positioned manner, one further vertical de-stacker each;
   4.3 a feed conveyor configured to laterally deliver the cell components to the at least one vertical de-stacker;
   4.4 a guiding system, which is funnel-shaped in at least some areas, configured to position the cell components in a direction transverse to a delivery direction during delivery;
   4.5 a row of positive gripping members that are configured to positively grip the cell components and are movable for delivering the cell components towards the vertical de-stacker;
   4.6 a drive system for a delivery movement;
   4.7 at least one actuator configured to drive the lifting and lowering movement of the cell components in the vertical magazine and at least one preferably switchable coupling device configured to couple the actuator with the lifting and lowering device of the at least one vertical de-stacker;
   4.8 the delivery device being configured to accommodate a first vertical de-stacker at a first accommodating unit and a second vertical de-stacker at a second accommodating unit and to fill them consecutively;
   4.9 the delivery device being configured to fill in parallel several vertical de-stackers at accommodating units disposed consecutively in the delivery direction; and
   4.10 the delivery device being configured to fill the at least one vertical de-stacker from above.

5. The manufacturing device according to claim 1, wherein at least one of
   5.1 a plurality of stacking devices is provided and configured to be moved in a loop between the at least one stacking station and at least one further processing station for further processing the fuel cell layer structure stacked in each of the plurality of stacking devices, or
   5.2 a plurality of vertical de-stackers is provided and configured to be moved in a loop between an accommodating unit at the at least one stacking station and at least one accommodating unit at the at least one filling station.

6. The manufacturing device according to claim 1, further comprising at least one of the following stations:
   6.1 a depositing station configured to deposit end components of the fuel cell layer structure at the at least one stacking device,
   6.2 a removal station configured to remove the fuel cell layer structure from the at least one stacking device,
   6.3 at least one pressing station with a pressing machine configured to press the fuel cell layer structure.

7. A manufacturing method for manufacturing a fuel cell layer structure with alternately arranged first cell components and second cell components, each first cell component being a plate component and each second cell component being a membrane component, comprising:
   providing at least one stacking device at a stacking station;
   vertically de-stacking a first cell component in alternation with a lateral feeding of a second cell component on the stacking device;
   transporting the stacking device with the fuel cell layer structure thus formed towards the further processing and removal of the fuel cell layer structure; and
   transporting the stacking device back to the stacking station.

8. The manufacturing method according to claim 7, carried out with a manufacturing device configured to manufacture the fuel cell layer structure with alternately arranged first cell components and second cell components, each first cell component being a plate component and each second cell component being a membrane component, the manufacturing device comprising:
- at least one stacking station with at least one stacking device configured to stack the first and the second cell component on top of one another in an alternating manner;
- at least one vertical de-stacker, which is configured to be moved between at least one filling station and the at least one stacking station, to accommodate a plurality of first cell components in a vertical arrangement with a lifting and lowering device for lifting and lowering the first cell components and for de-stacking separated first cell components in the vertical direction to the at least one stacking device; and
- a lateral feed system configured to laterally feed separated second cell components to the stacking device.

9. The manufacturing method according to claim 7, further comprising at least one of the following steps:
- 9.1 using several stacking devices and moving the stacking devices in a loop between the stacking station and at least one further processing station; or
- 9.2 using several vertical de-stackers and moving the vertical de-stackers in a loop between the stacking station and accommodating units of a filling station.

10. A computer program comprising machine-readable control instructions, which, when uploaded into a control system of a manufacturing device according to claim 4, cause the manufacturing device to carry out a manufacturing method comprising:
- providing a stacking device at a stacking station;
- vertically de-stacking a first cell component in alternation with a lateral feeding of a second cell component on the stacking device;
- transporting the stacking device with the fuel cell layer structure thus formed towards the further processing and removal of the fuel cell layer structure; and
- transporting the stacking device back to the stacking station.

11. A control system with a control unit for a manufacturing device according to claim 1, wherein the control system is configured to control the manufacturing device to carry out the manufacturing method comprising:
- providing a stacking device at a stacking station;
- vertically de-stacking a first cell component in alternation with a lateral feeding of a second cell component on the stacking device;
- transporting the stacking device with the fuel cell layer structure thus formed towards the further processing and removal of the fuel cell layer structure; and
- transporting the stacking device back to the stacking station.

* * * * *